US012513577B2

United States Patent
Liu et al.

(10) Patent No.: US 12,513,577 B2
(45) Date of Patent: Dec. 30, 2025

(54) SERVICE INTERRUPTION MEASUREMENT

(71) Applicant: QUALCOMM Incorporated, San Diego, CA (US)

(72) Inventors: Huichun Liu, Beijing (CN); Gavin Bernard Horn, La Jolla, CA (US); Xipeng Zhu, San Diego, CA (US); Karthika Paladugu, San Diego, CA (US); Peng Cheng, Beijing (CN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 919 days.

(21) Appl. No.: 17/597,457

(22) PCT Filed: Jul. 10, 2019

(86) PCT No.: PCT/CN2019/095343
§ 371 (c)(1),
(2) Date: Jan. 6, 2022

(87) PCT Pub. No.: WO2021/003684
PCT Pub. Date: Jan. 14, 2021

(65) Prior Publication Data
US 2022/0369178 A1    Nov. 17, 2022

(51) Int. Cl.
*H04W 36/00* (2009.01)
*H04W 24/10* (2009.01)
(52) U.S. Cl.
CPC ....... *H04W 36/0058* (2018.08); *H04W 24/10* (2013.01)

(58) Field of Classification Search
CPC . H04W 74/0833; H04W 72/23; H04W 64/00; H04W 12/06; H04W 76/15;
(Continued)

(56) References Cited

U.S. PATENT DOCUMENTS

| 2009/0247150 A1 | 10/2009 | Fischer et al. |
| 2011/0183672 A1 | 7/2011 | Jeong et al. |

(Continued)

FOREIGN PATENT DOCUMENTS

| CN | 105519190 A | 4/2016 |
| CN | 108235394 A | 6/2018 |

(Continued)

OTHER PUBLICATIONS

Supplementary European Search Report—EP19937247—Search Authority—Munich—May 17, 2023.

(Continued)

*Primary Examiner* — Kwasi Karikari
(74) *Attorney, Agent, or Firm* — Harrity & Harrity, LLP

(57) ABSTRACT

Various aspects of the present disclosure generally relate to wireless communication. In some aspects, a user equipment (UE) may receive a measurement configuration for a service interruption measurement regarding a handover of the UE from a source cell to a target cell. The UE may transmit measurement information that identifies at least one of the service interruption measurement or a time value used to determine the service interruption measurement. Numerous other aspects are provided.

30 Claims, 21 Drawing Sheets

(58) Field of Classification Search
CPC ........... H04W 56/001; H04W 36/0085; H04W 36/00; H04W 36/304; H04W 60/04; H04W 36/305
See application file for complete search history.

(56) References Cited

U.S. PATENT DOCUMENTS

| | | | |
|---|---|---|---|
| 2012/0069732 A1* | 3/2012 | Xu .................... | H04W 36/0058 370/242 |
| 2016/0330785 A1* | 11/2016 | Chang .................. | H04L 41/069 |
| 2019/0182717 A1 | 6/2019 | Ye et al. | |

FOREIGN PATENT DOCUMENTS

| WO | WO-2015075501 A1 | 5/2015 |
|---|---|---|
| WO | WO-2015196431 A1 | 12/2015 |

OTHER PUBLICATIONS

Supplementary Partial European Search Report—EP19937247—Search Authority—Munich—Feb. 16, 2023.
International Search Report and Written Opinion—PCT/CN2019/095343—ISA/EPO—Apr. 8, 2020.

* cited by examiner

SERVICE INTERRUPTION MEASUREMENT

CROSS-REFERENCE TO RELATED APPLICATION

This application is a 371 national stage of Patent Cooperation Treaty (PCT Application No. PCT/CN2019/095343 filed on Jul. 10, 2019, entitled "SERVICE INTERRUPTION MEASUREMENT," which is hereby expressly incorporated by reference herein.

FIELD OF THE DISCLOSURE

Aspects of the present disclosure generally relate to wireless communication and to techniques and apparatuses for service interruption measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a measurement configuration for a service interruption measurement regarding a handover of the UE from a source cell to a target cell; and transmitting measurement information that identifies at least one of the service interruption measurement or a time value used to determine the service interruption measurement.

In some aspects, a method of wireless communication, performed by a network node, may include receiving or determining information identifying a first time value for a service interruption measurement, wherein the service interruption measurement relates to a handover of a user equipment (UE) from a source cell to a target cell; receiving information identifying a second time value for the service interruption measurement; and determining the service interruption measurement using the first time value and the second time value.

In some aspects, a method of wireless communication, performed by a first network node, may include receiving or determining a time value for a service interruption measurement in connection with a handover of a user equipment (UE) between a source cell and a target cell, wherein the source cell is provided by one of the first network node or a second network node and the target cell is provided by the other of the first network node or the second network node; and transmitting, to the second network node, measurement information based at least in part on the time value or the service interruption measurement.

In some aspects, a UE for wireless communication may include memory and one or more processors operatively coupled to the memory. The memory and the one or more processors may be configured to receive a measurement configuration for a service interruption measurement regarding a handover of the UE from a source cell to a target cell; and transmit measurement information that identifies at least one of the service interruption measurement or a time value used to determine the service interruption measurement.

In some aspects, a first network node for wireless communication may include memory and one or more processors operatively coupled to the memory. The memory and the one or more processors may be configured to receive or determine a time value for a service interruption measurement in connection with a handover of a user equipment (UE) between a source cell and a target cell, wherein the source cell is provided by one of the first network node or a second network node and the target cell is provided by the other of the first network node or the second network node; and transmit, to the second network node, measurement information based at least in part on the time value or the service interruption measurement.

In some aspects, a network node for wireless communication may include memory and one or more processors operatively coupled to the memory. The memory and the one or more processors may be configured to receive or determine information identifying a first time value for a service interruption measurement, wherein the service interruption measurement relates to a handover of a user equipment (UE) from a source cell to a target cell; receive information identifying a second time value for the service interruption measurement; and determine the service interruption measurement using the first time value and the second time value.

In some aspects, a non-transitory computer-readable medium may store one or more instructions for wireless communication. The one or more instructions, when executed by one or more processors of a network node, may cause the one or more processors to: receive or determine a time value for a service interruption measurement in connection with a handover of a user equipment (UE) between a source cell and a target cell, wherein the source cell is provided by one of the first network node or a second network node and the target cell is provided by the other of the first network node or the second network node; and transmit, to the second network node, measurement information based at least in part on the time value or the service interruption measurement.

In some aspects, a non-transitory computer-readable medium may store one or more instructions for wireless communication. The one or more instructions, when executed by one or more processors of a network node, may cause the one or more processors to: receive or determine information identifying a first time value for a service interruption measurement, wherein the service interruption measurement relates to a handover of a user equipment (UE) from a source cell to a target cell; receive information identifying a second time value for the service interruption measurement; and determine the service interruption measurement using the first time value and the second time value.

In some aspects, a non-transitory computer-readable medium may store one or more instructions for wireless communication. The one or more instructions, when executed by one or more processors of a network node, may cause the one or more processors to: receive a measurement configuration for a service interruption measurement regarding a handover of the UE from a source cell to a target cell; and transmit measurement information that identifies at least one of the service interruption measurement or a time value used to determine the service interruption measurement.

In some aspects, an apparatus for wireless communication may include means for receiving a measurement configuration for a service interruption measurement regarding a handover of the apparatus from a source cell to a target cell; and means for transmitting measurement information that identifies at least one of the service interruption measurement or a time value used to determine the service interruption measurement.

In some aspects, an apparatus for wireless communication may include means for receiving or determining a time value for a service interruption measurement in connection with a handover of a user equipment (UE) between a source cell and a target cell, wherein the source cell is provided by one of the apparatus or a second network node and the target cell is provided by the other of the apparatus or the second network node; and means for transmitting, to the second network node, measurement information based at least in part on the time value or the service interruption measurement.

In some aspects, an apparatus for wireless communication may include means for receiving or determining information identifying a first time value for a service interruption measurement, wherein the service interruption measurement relates to a handover of a user equipment (UE) from a source cell to a target cell; means for receiving information identifying a second time value for the service interruption measurement; and means for determining the service interruption measurement using the first time value and the second time value.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
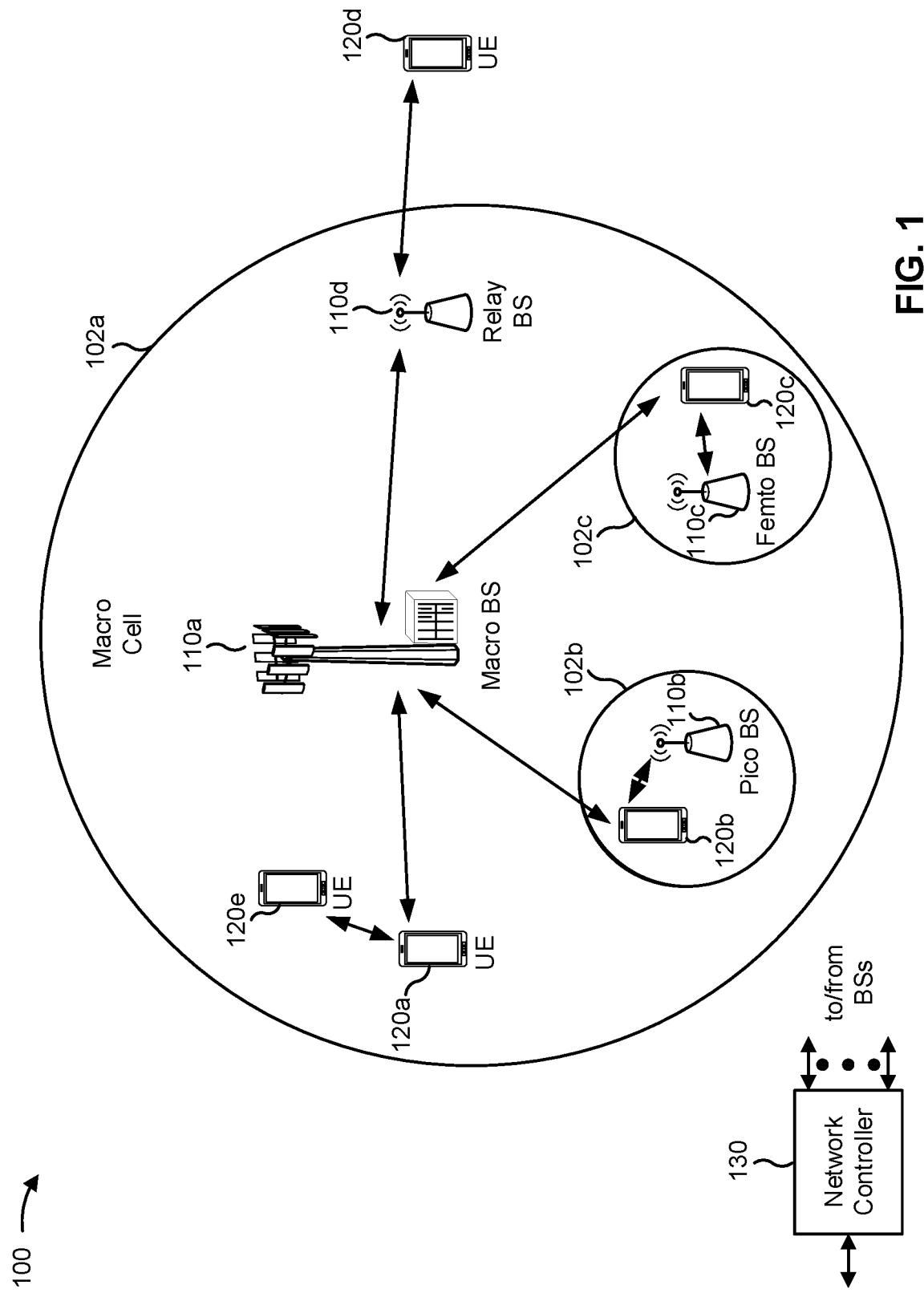
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, the network controller 130 may be referred to as a network node. In some aspects, the network controller may be include one or more network devices or functions (e.g., an access management function, a user plane function, a session management function, a next generation radio access network, and/or the like).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
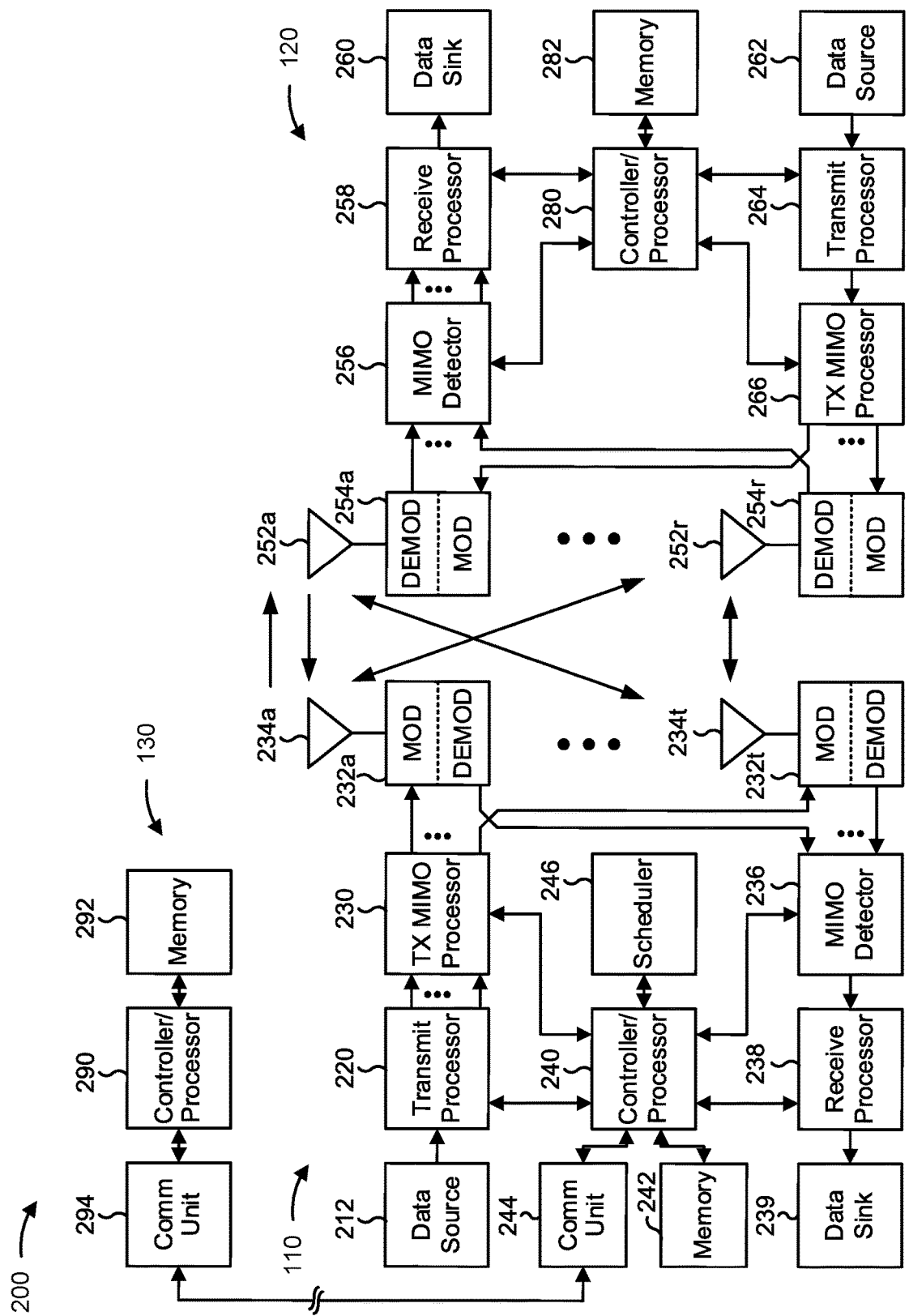
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be referred to as a network node herein. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with service interruption measurement, as described in more detail elsewhere herein. For example, controller/processor 240 of base station 110, controller/processor 280 of UE 120, and/or any other component(s) of FIG. 2 may perform or direct operations of, for example, process 1800 of FIG. 18, process 1900 of FIG. 19, process 2000 of FIG. 20, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 1800 of FIG. 18, process 1900 of FIG. 19, process 2000 of FIG. 20, and/or other processes as described herein. A scheduler 246 may schedule UEs for data transmission on the downlink and/or uplink.

In some aspects, UE 120 may include means for receiving a measurement configuration for a service interruption measurement regarding a handover of the UE from a source cell to a target cell; means for transmitting measurement information that identifies at least one of the service interruption measurement or a time value used to determine the service interruption measurement; means for determining the time value in connection with receiving a handover command from the source cell; means for determining the time value in connection with transmitting a radio resource control reconfiguration complete message associated with the handover; means for determining measurement information for multiple handovers; means for transmitting the measurement information for the multiple handovers; means for transmitting an indication that the measurement information is available, wherein transmitting the measurement information is based at least in part on receiving a request for the measurement information based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network node (e.g., base station 110) may include means for receiving or determining a time value for a service interruption measurement in connection with a handover of a user equipment (UE) between a source cell and a target cell; means for transmitting, to a second network node, measurement information based at least in part on the time value or the service interruption measurement; means for determining the time value in connection with transmitting a radio resource control reconfiguration message to the UE; means for determining the time value in connection with receiving a radio resource control reconfiguration complete message associated with the handover; means for receiving, from the second network node, an indication to determine the time value; means for transmitting, to the second network node, an acknowledgment indicating that the first network node supports the determination of the time value; means for receiving configuration information including a measurement configuration for determining the measurement information, wherein determining the measurement information is based at least in part on the measurement configuration; means for receiving information identifying a second time value from the UE; means for determining the measurement information based at least in part on the first time value and the second time value; means for receiving or determining information identifying a first time value for a service interruption measurement, wherein the service interruption measurement relates to a handover of a user equipment (UE) from a source cell to a target cell; means for receiving information identifying a second time value for the service interruption measurement; means for determining the service interruption measurement using the first time value and the second time value; means for receiving, from the UE, an indication that the first time value is available; means for transmitting a request for the first time value based at least in part on the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may be transferred from a source base station to a target base station using a handover procedure (referred to herein as a handover). For example, the source base station, the target base station, and/or network devices associated with the source base station or the target base station may communicate with each other to transfer information associated with the UE and/or an active connection of the UE from the source base station to the target base station. The handover may be performed between base stations of the same radio access technology (RAT) or between base stations of different RATs.

Some RATs, such as 5G/NR, may provide services with stringent requirements for transmission latency, mobility interruption, and/or the like. One such service is ultra-reliable low latency communication (URLLC). It may be useful to determine measurement information for interruptions associated with a handover, for example, to determine whether the network can satisfy quality of service (QoS) requirements, to tune network performance based at least in part on the measurement information, and/or the like. However, a particular device (e.g., a UE, a base station, or a network device) may have access to only a subset of the information needed to determine a handover interruption measurement. Furthermore, some service interruptions associated with a handover may occur only on the UE side (e.g., in the interface or connection between the UE and the base station), only on the network side (e.g., in the network supporting the connection between the UE and the base station), or in a combination of the UE side and the network side, which may present additional challenges and for which no measurement technique is standardized.

Some techniques and apparatuses described herein provide processes for determining service interruption measurements associated with a handover. For example, the service interruption measurement may relate to a UE-side interruption, a network-side interruption, or a combination of a UE-side interruption and a network-side interruption. Furthermore, the service interruption measurement may be determined by the UE, the target base station, the source base station, or one or more network devices using information gathered by one or more of these devices. Still further, the techniques and apparatuses described herein provide signaling for the exchange of information used to determine the service interruption as well as information identifying the service interruption measurement. These techniques may be applied for a variety of handover types, such as an intra-RAT handover, an inter-RAT handover, a conditional handover, a make-before-break handover, a random access channel (RACH)-less handover, a multi-RAT dual-connectivity (MR-DC) handover, another type of handover, or a combination thereof. Furthermore, some techniques and apparatuses described herein may be used to determine a measurement regarding an interruption (e.g., a loss of communication capabilities) or a reduced capability duration, each of which may be referred to herein as a service interruption measurement. Thus, measurement of interruptions associated with handover may be provided, thereby enabling network performance to be measured and improved, which improves network throughput and reduces violation of QoS requirements and/or the like.

In this way, end-to-end mobility interruption measurement is provided using a UE-side interruption measurement method and/or a network-side interruption measurement method. These techniques may be applicable for mobility with dual-connectivity, including secondary node (SN) addition/SN change/SN release, Inter-Master Node handover with or without Secondary Node change, conditional HO, and make-before-break HO.

Figure 3:
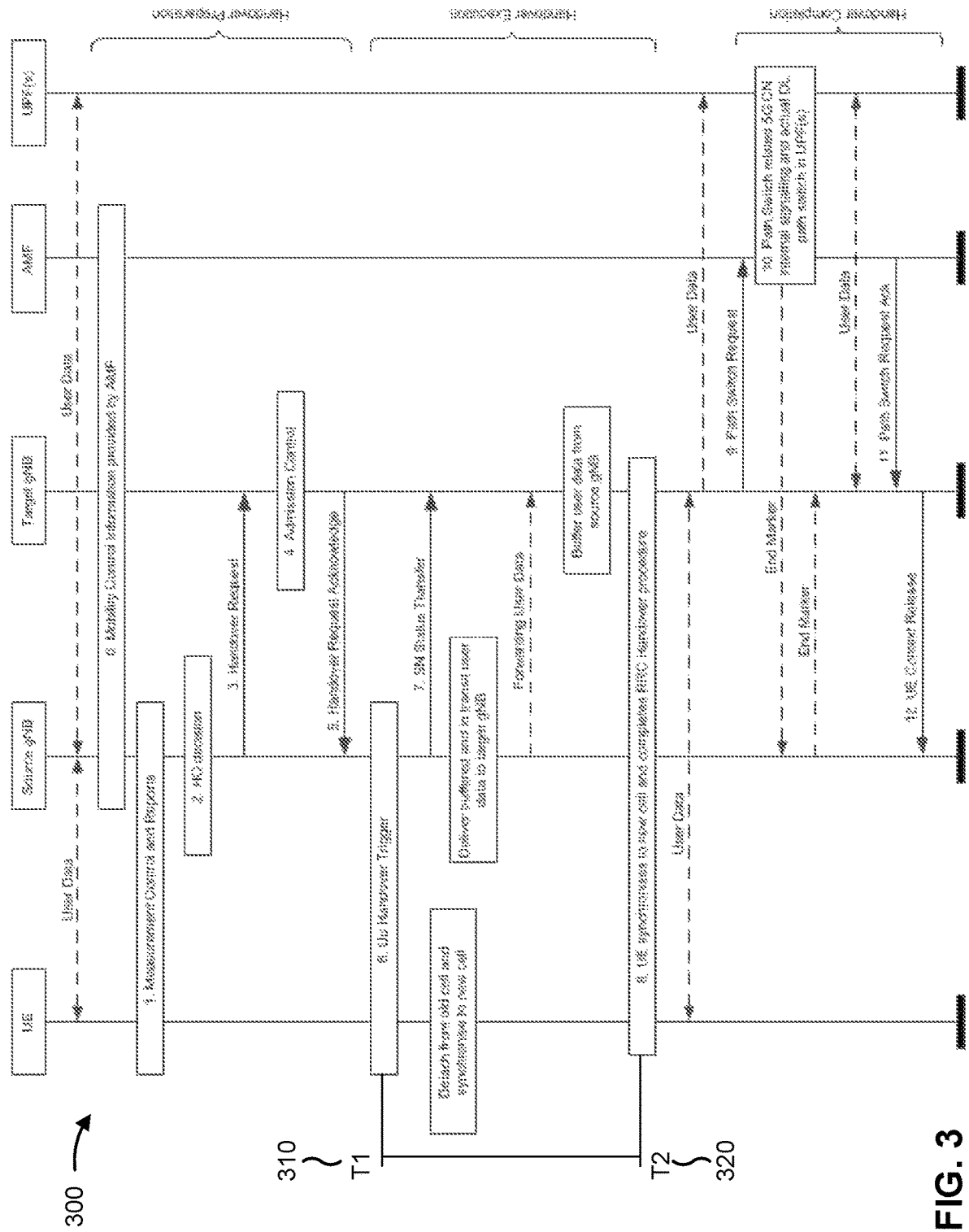
FIG. 3 is a diagram illustrating an example of UE-side service interruption measurement time values for a handover, in accordance with various aspects of the present disclosure.

FIG. 3 is a diagram illustrating an example 300 of UE-side service interruption measurement time values for a handover (e.g., a regular handover, a break-before-make handover, and/or the like), in accordance with various aspects of the present disclosure.

The service interruption measurement may relate to at least one of a UE-side service interruption or a network-side service interruption. The UE-side service interruption for a handover (e.g., a single-connectivity handover, a non-conditional handover, and/or the like) is described in connection with FIG. 3, and the network-side service interruption is described in connection with FIG. 4. A UE-side service interruption may refer to a time duration in which the UE cannot exchange user-plane packets with a source base station or a target base station during a handover. For example, the UE-side service interruption may refer to a time during which a Uu interface between the UE and the source base station or the target base station is interrupted.

A start of the UE-side service interruption is represented by T1 and shown by reference number 310. For example, for the handover shown in FIG. 3, T1 may correspond to a time at which the UE receives a handover command (e.g., a Uu handover trigger and/or the like) from the source base station (shown as source gNB). For example, T1 may correspond to a time at which the UE receives a radio resource control (RRC) reconfiguration with synchronization information from the source base station. An end of the UE-side service interruption is represented by T2 and shown by reference number 320. For example, for the handover shown in FIG. 3, T2 may correspond to a time at which the UE transmits a radio resource control (RRC) reconfiguration complete message to the target base station (shown in FIG. 3 as "UE synchronizes to new cell and completes RRC handover procedure", and which may include a handover with a contention-based random access (CBRA) or a contention-free random access (CFRA)). The UE-side service interruption measurement may be defined as T2-T1.

As indicated above, FIG. 3 is provided as one or more examples. Other examples may differ from what is provided with regard to FIG. 3.

Figure 4:
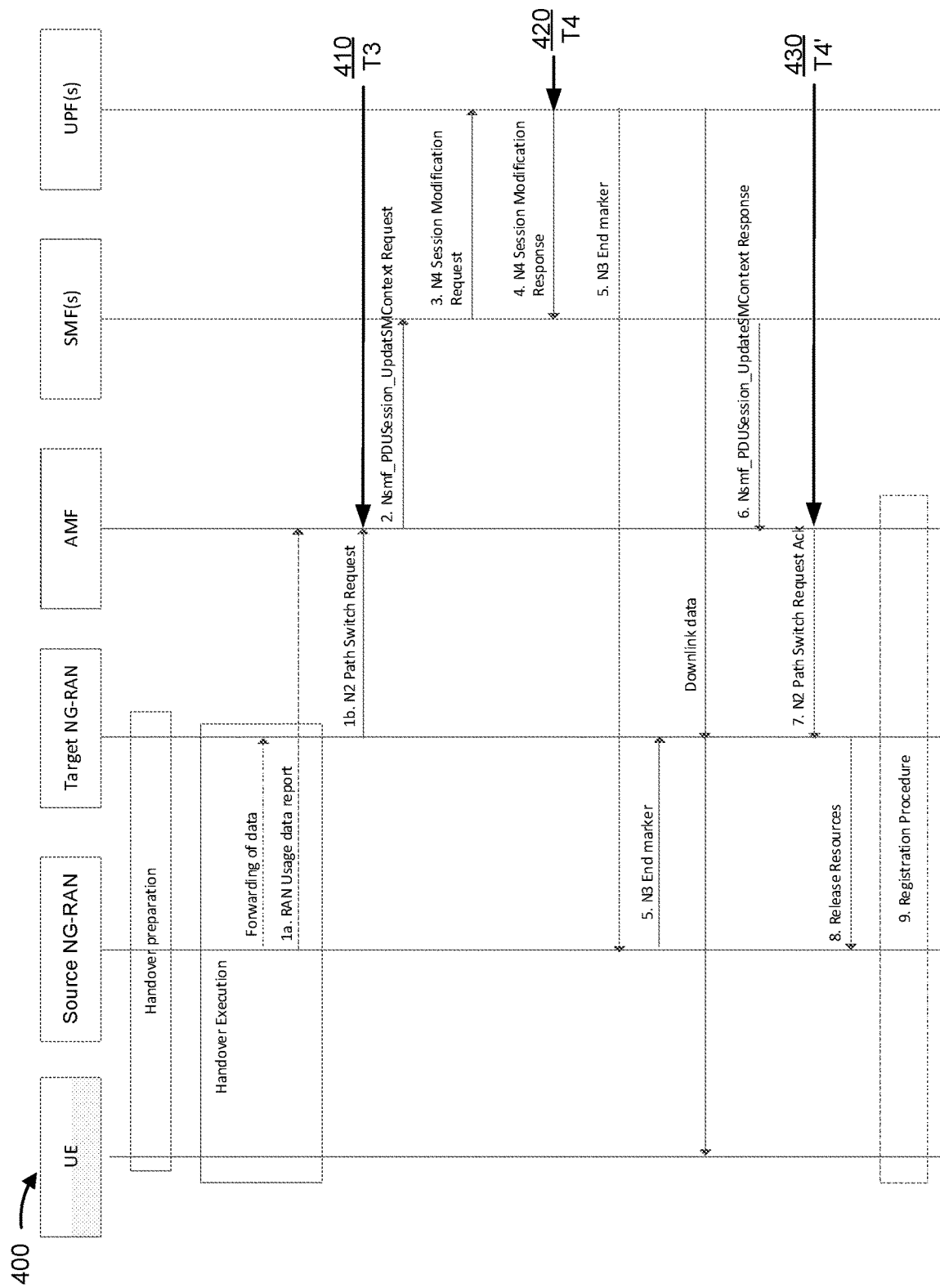
FIG. 4 is a diagram illustrating an example of network-side service interruption measurement time values for a handover, in accordance with various aspects of the present disclosure.

FIG. 4 is a diagram illustrating an example 400 of network-side service interruption measurement time values for a handover, in accordance with various aspects of the present disclosure. A network-side service interruption may refer to a time duration of an interruption to a UE's data traffic caused by a device upstream from the source base station or the target base station. For example, a network-side service interruption may occur in a handover without data forwarding, as described below.

As shown in FIG. 4, a start of a network-side service interruption is represented by T3 and shown by reference number 410. For example, for the handover shown in FIG. 4, T3 may correspond to a time at which the target base station (e.g., a target next generation radio access network (NG-RAN) notifies an access management function (AMF) of the UE's completion of the handover (e.g., in a path switch request such as an Xn handover message, a handover notification such as an N2 handover message, and/or the like). As shown in FIG. 4, an end of the network-side service interruption is represented by T4 and shown by reference number 420. As shown in FIG. 4, T4 may correspond to a time at which a user plane function (UPF) transmits an N4 session modification response to a session management function (SMF). The network-side service interruption measurement may be defined as T4-T3. In some aspects, the target base station may determine the network-side service interruption using T4', shown by reference number 430, which may correspond to an N2 path switch request acknowledgment (e.g., T4'-T3). This may enable the target base station to determine the network-side service interruption without explicit signaling of T4 to the target base station by the UPF or the SMF, thereby conserving signaling resources. It should be understood that T4 can refer to either T4 or T4'.

In some aspects, for a handover with data forwarding, there may be no network-side interruption on the downlink, since the downlink is forwarded from the source base station to the target base station during the handover period. In some aspects, no network-side uplink interruption may occur, since the target base station may forward uplink packets from the target RAN to a target UPF and/or a UPF associated with a protocol data unit (PDU) session anchor once the UE accesses the target base station. Thus, the end-to-end uplink service interruption associated with the handover may be the UE-side service interruption (e.g., T2-T1). The end-to-end downlink service interruption associated with the handover when downlink data forwarding is performed may be equal to the UE-side service interruption (e.g., T2-T1). The end-to-end downlink service interruption associated with the handover when downlink data forwarding is not performed may be equal to the UE-side service interruption plus the network-side service interruption (e.g., (T2-T1)+(T4-T3) or (T2-T1+(T4'-T3)).

The UE-side service interruption may be measured by the UE, the source base station, the target base station, or one or more network devices, as described in more detail in connection with FIGS. 9-17, below. The network-side service interruption may be measured by the source base station, the target base station, or one or more network devices, as is also described in more detail in connection with FIGS. 9-17, below. In some aspects, the UE-side and/or network-side service interruption may be determined based at least in part on a measurement configuration, as described in more detail in connection with FIGS. 9-17.

As indicated above, FIG. 4 is provided as one or more examples. Other examples may differ from what is provided with regard to FIG. 4.

Figure 5A:
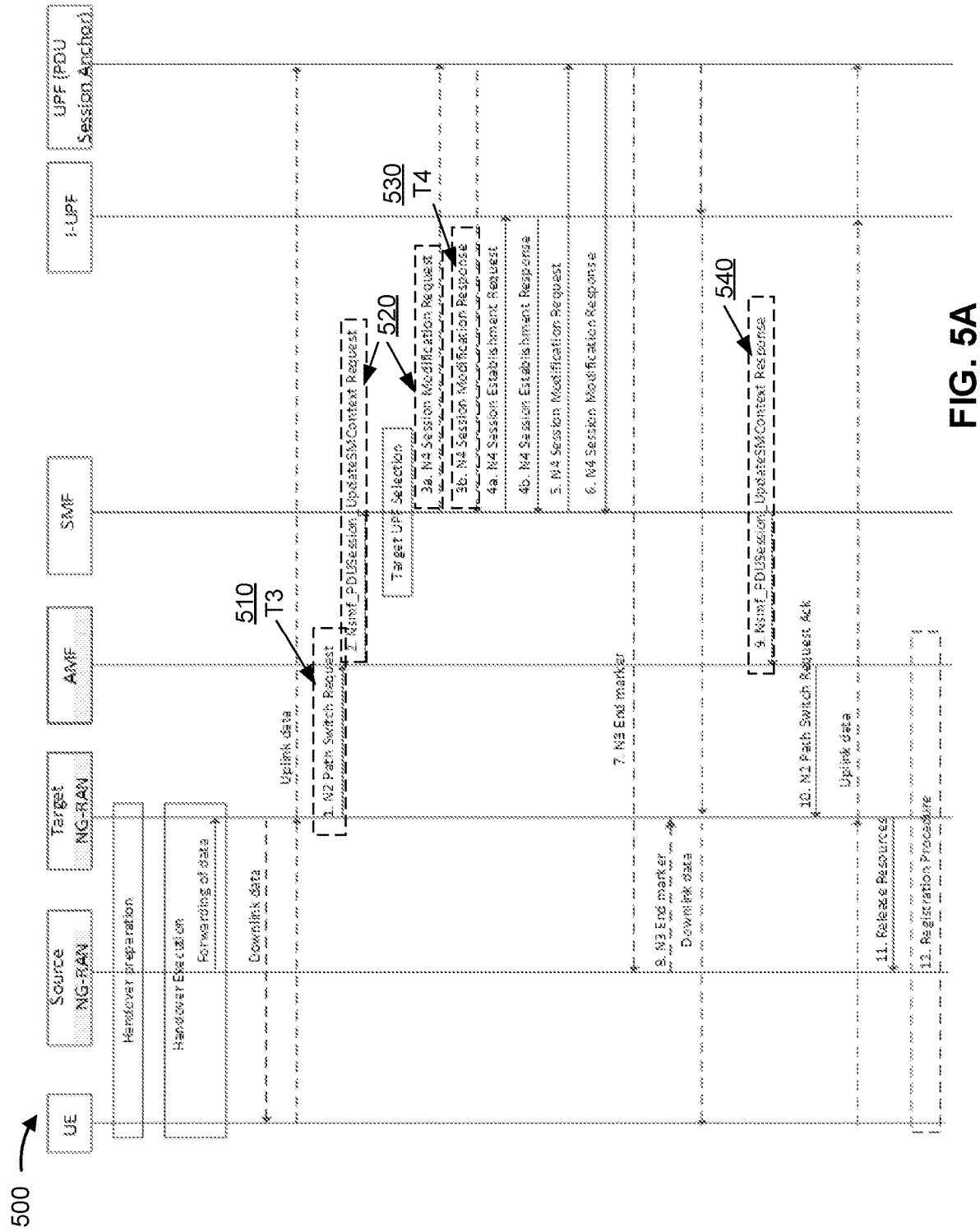
FIGS. 5A and 5B are diagrams illustrating examples of signaling of service interruption measurement time values for a handover, in accordance with various aspects of the present disclosure.
Figure 5B:
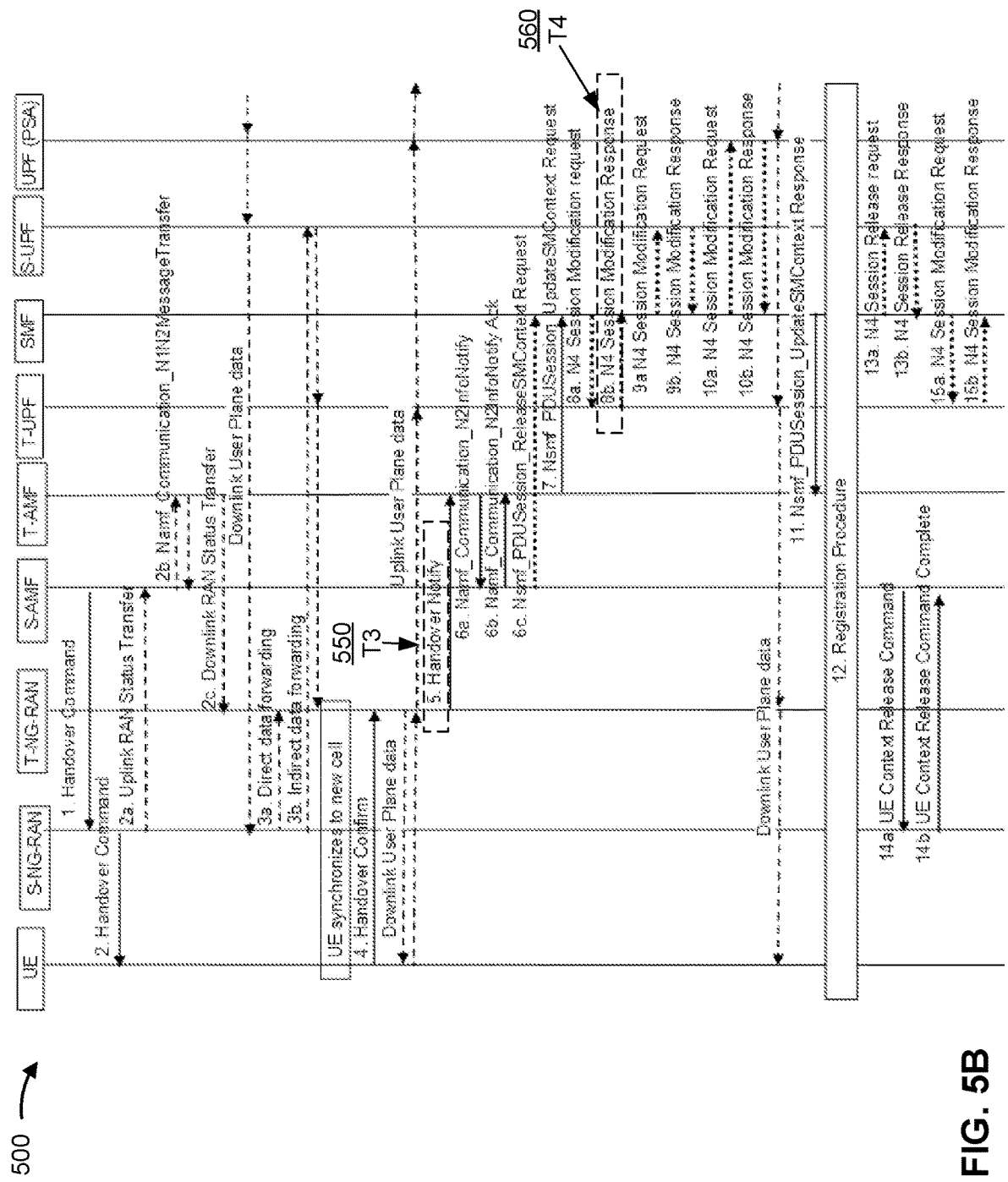

FIGS. 5A and 5B are diagrams illustrating examples 500 of signaling of service interruption measurement time values for a handover, in accordance with various aspects of the present disclosure. FIG. 5A shows a handover procedure for an Xn based inter-NG-RAN handover with an intermediate UPF, and FIG. 5B shows a handover procedure for an execution stage of an inter-NG-RAN N2 based handover.

As shown in FIG. 5A, and by reference number 510, T3 (e.g., the start of the network-side service interruption) may correspond to an N2 path switch request or a handover notification from the target base station (e.g., the target NG-RAN) to the AMF. In some aspects, the messages indicated by reference number 520 (e.g., the Nsmf PDU session update session modification context request and the N4 session modification request) may include an indication that the service interruption measurement is to be performed. This may include, for example, an information element (IE) and/or the like. In some aspects, the message shown by reference number 530 (e.g., the N4 session modification response) may include an indication of the value of T4, such as a timestamp and/or the like. For example, the UPF may determine T4 based at least in part on a time at which the N4 session modification response is transmitted, and the N4 session modification response may include information identifying when the N4 session modification response is transmitted. In some aspects, the message shown by reference number 540 may include an indication of the value of T4. The AMF, SMF, UPF, and/or the base station (e.g., source base station or target base station) may exchange signaling indicating time values associated with a network-side service interruption and/or may determine this network-side service interruption using the time values, as described in connection with FIGS. 9-17, below. The messages used to determine or exchange the T3 and T4 values are shown by reference numbers 550 and 560, respectively, in FIG. 5B.

As indicated above, FIGS. 5A and 5B are provided as one or more examples. Other examples may differ from what is provided with regard to FIGS. 5A and 5B.

Figure 6:
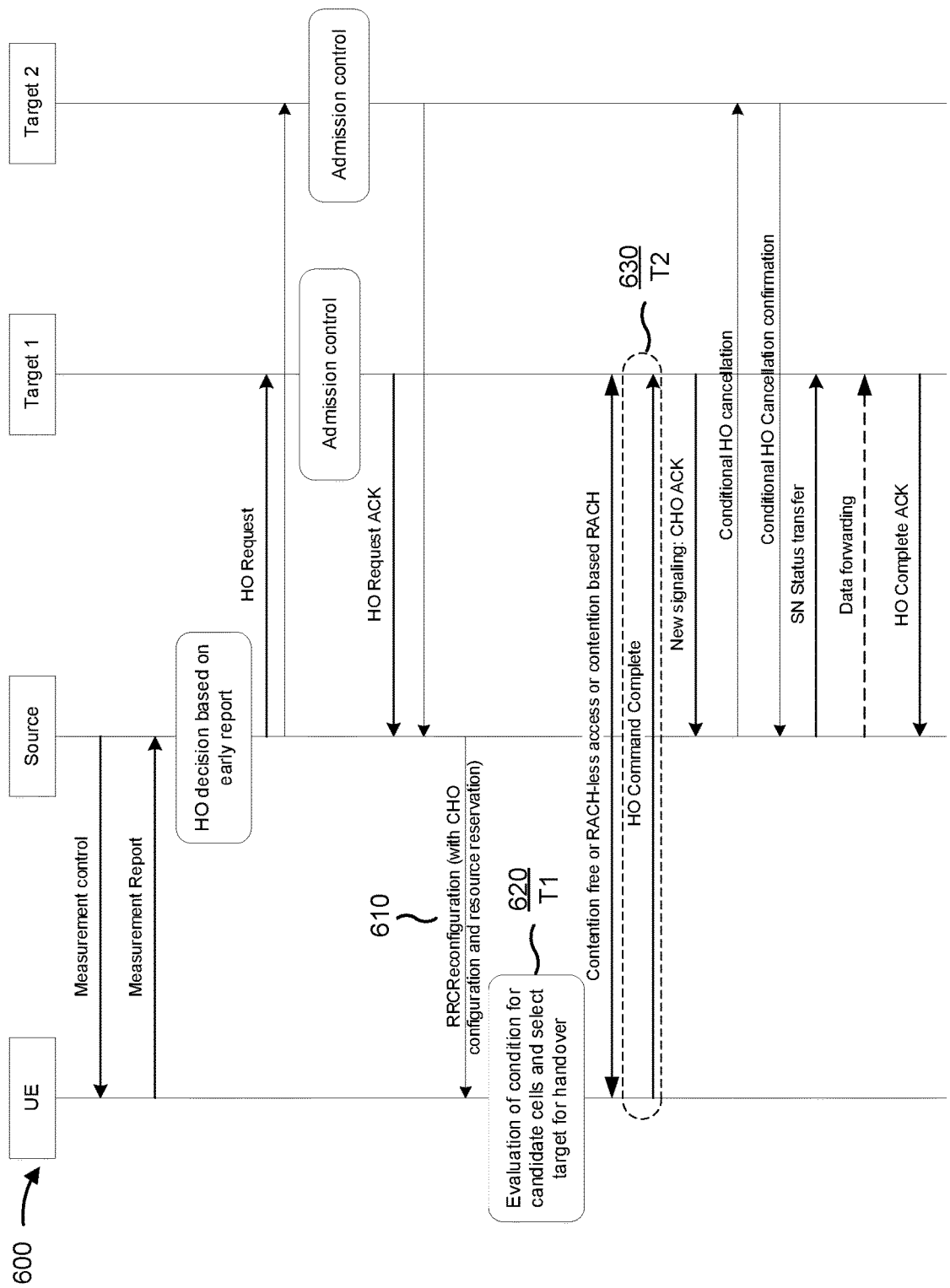
FIG. 6 is a diagram illustrating an example of service interruption measurement time values for a conditional handover, in accordance with various aspects of the present disclosure.

FIG. 6 is a diagram illustrating an example 600 of service interruption measurement time values for a conditional handover (CHO), in accordance with various aspects of the present disclosure. In a conditional handover, the UE 120 may receive a CHO configuration 610 that indicates a candidate target cell configuration, a CHO condition to trigger handover, and/or the like. As shown by reference number 620, the UE 120 may determine that a CHO condition is satisfied by a target base station, and may initiate the CHO based at least in part on determining that the CHO condition is satisfied. In this case, T1 (e.g., the start of the UE-side service interruption) may correspond to a time when the UE determines that the CHO condition is satisfied and determines to disconnect from the source base station and connect to the target base station. T1 may be recorded by the UE. As shown by reference number 630, T2 may correspond to a time when the UE transmits an RRC reconfiguration complete message to the target base station. T2 may be recorded by the UE or the target base station. In some aspects, the UE may determine the service interruption measurement and may provide the service interruption measurement to the network (e.g., the source base station or the target base station). In some aspects, the UE may determine and provide T1 to the network, and the network may determine T2 and the service interruption measurement.

In some aspects, the UE may perform a CHO without notifying a source base station upon handover execution. In this case, when the UE does not perform a make-before-break handover (make-before-break handover is described in more detail below in connection with FIG. 7), the UE may disconnect from the source cell upon executing the handover command. In such a case, the UE may not send an acknowledgment or negative acknowledgement to the source base station after disconnecting from the source cell. Thus, the source base station may not know which target base station is selected by the UE, so the source base station can only perform data forwarding after receiving an inter-node message from the target base station. In this case, the end-to-end uplink service interruption may be equal to the UE-side service interruption. The end-to-end downlink service interruption may be equal to the UE-side service interruption plus the network-side downlink interruption, which may be measured as described in connection with FIGS. 3-5B.

In some aspects, the UE may notify the source base station upon execution of the CHO. In such a case, when the UE does not perform a make-before-break handover, the UE may use Layer 1 (e.g., physical layer signaling), a media access control (MAC) control element (CE), or a higher-layer message to notify the source base station of HO execution. In this case, T1 may correspond to the time at which the UE transmits the notification to the source base station. In some aspects, the notification may identify the target base station so that the source base station can begin data forwarding to the target base station. In some aspects, T1 can be measured by the UE and reported to the source base station with the notification. In some aspects, T1 can be measured by the source base station upon receiving the notification from the UE. T2 may be defined similarly as for a HO such as a HO described in connection with FIGS. 3 and 4 (e.g., a time when the UE transmits a RRCReconfigurationComplete to the target base station). T2 can be measured by the UE or the target base station. The UE-side service interruption may be determined similarly as for the HO described in connection with FIGS. 3 and 4 (e.g., using a UE-based approach, a network-based approach, or a combination of the UE-based approach and the network-based approach.

As indicated above, FIG. 6 is provided as one or more examples. Other examples may differ from what is provided with regard to FIG. 6.

Figure 7:
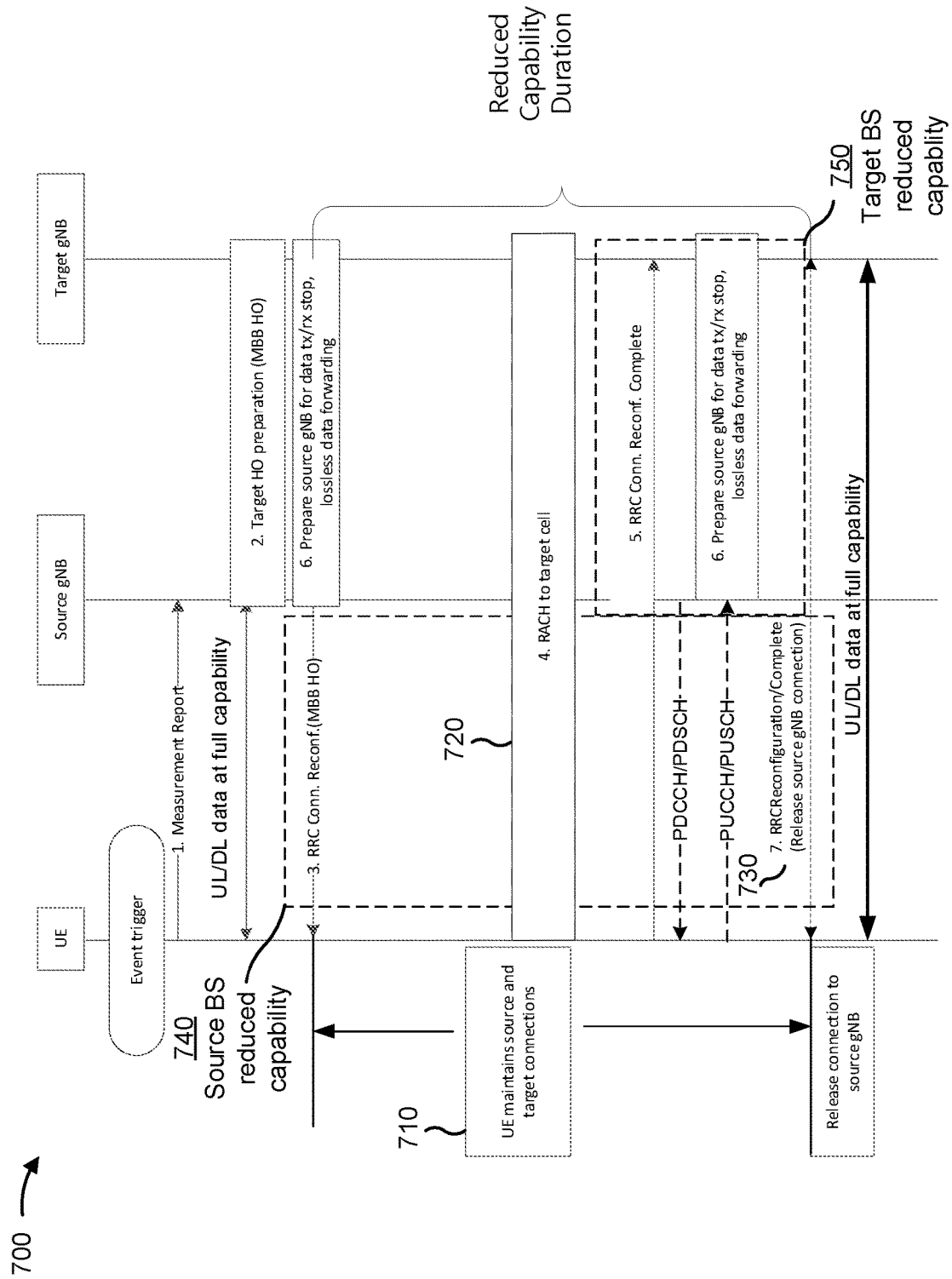
FIG. 7 is a diagram illustrating an example of service interruption measurement time values for a make-before-break handover, in accordance with various aspects of the present disclosure.

FIG. 7 is a diagram illustrating an example 700 of service interruption measurement time values for a make-before-break (MBB) handover, in accordance with various aspects of the present disclosure. In an MBB handover, the UE maintains an active connection with a source base station while a connection with the target base station is established, as shown by reference number 710.

The UE may perform a RACH procedure with the target base station to synchronize with the target cell, shown by reference number 720, while the connection with the source cell is active, and may release the source cell connection only after the target cell connection is established, as shown by reference number 730. Thus, the UE may not experience a full service interruption as part of the handover if the UE is capable of dual transmission or dual reception. However, due to the active connections with the source base station and the target base station, the capabilities of the UE may be reduced during the MBB handover. Thus, in the context of an MBB handover, the service interruption may refer to the period of time during which the UE experiences reduced capabilities. The source base station capability reduction is shown by reference number 740 and the target base station capability reduction is shown by reference number 750.

During the HO execution period, a UE capable of dual transmission or dual reception may maintain packet reception with regard to the source node, so there may be no downlink/uplink interruption. However, during this time, the UE may operate with a reduced capability on each link (source link or target link) for data transmission due to the reduced number of Tx/Rx antennas, component carriers, or multiple-input multiple-output layers available for a given link). This may result in service interruption and may be beneficial to report.

During the HO execution period, a UE incapable of dual transmission or dual reception may experience a service interruption (e.g., a loss of traffic between the UE and the source base station or the target base station). In the case when no time division multiplexing (TDM) of source base station traffic and target base station traffic is performed during the MBB HO, the uplink service interruption can be measured similarly as was described in connection with FIGS. 3-5B, above. The case when TDM is performed for the MBB HO is described in connection with FIG. 8, below.

These techniques can also be applied for cells under different gNB-distributed units (DUs) with different gNB-central units (CUs), in intra-frequency or inter-frequency deployments, and in asynchronous or synchronous deployments. This may involve PDCP anchor changes, such as a new security context, and may involve a core network user plane path switch.

As indicated above, FIG. 7 is provided as one or more examples. Other examples may differ from what is provided with regard to FIG. 7.

Figure 8:
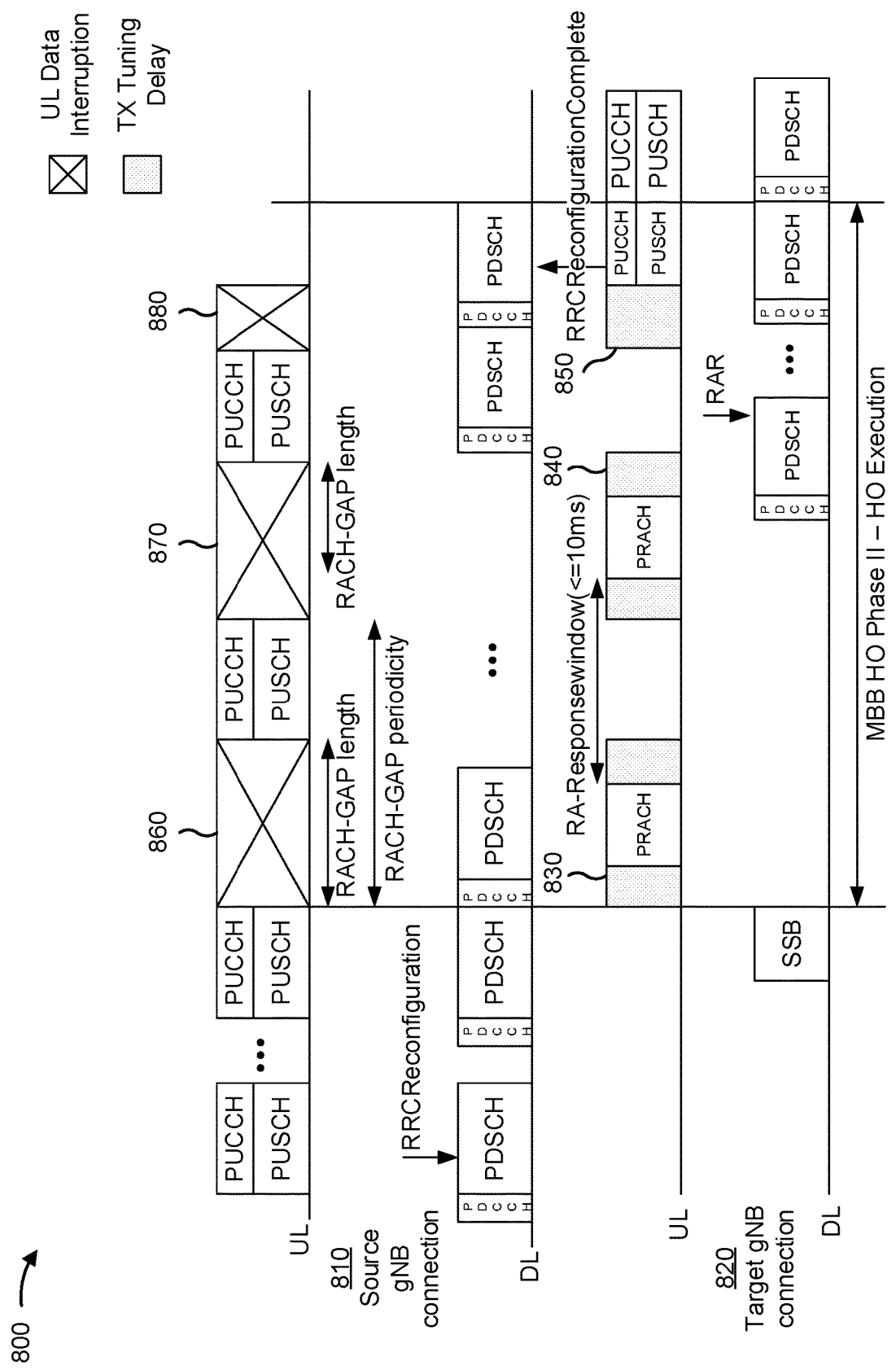
FIG. 8 is a diagram illustrating an example of service interruption measurement time values for a time division multiplexing (TDM) make-before-break handover, in accordance with various aspects of the present disclosure.

FIG. 8 is a diagram illustrating an example 800 of service interruption measurement time values for a TDM MBB handover, in accordance with various aspects of the present disclosure. Some UEs may support TDM between the source cell and the target cell, as illustrated by the TDM scheme illustrated in example 800. A source base station connection is shown by reference number 810 and a target base station connection is shown by reference number 820. Each includes an uplink (UL) and a downlink (DL). As shown by reference numbers 830, 840, and 850, the UE may perform one or more physical RACH (PRACH) attempts on the target cell.

Accordingly, as shown by reference numbers 860, 870, and 880, uplink data of the UE on the source cell may be interrupted due to the TDM scheme. In this case, the UE-side service interruption may be determined by the UE. For example, the UE may aggregate the times for which the UE tunes to the target cell to perform the one or more PRACH attempts (e.g., the times shown by reference numbers 860, 870, and 880), and may report the aggregated times as the uplink service interruption. Regarding the downlink service interruption, if the UE has no capability of simultaneous reception from the source cell and the target cell, then the UE may determine an aggregated service interruption time of interruptions to the downlink of the source cell, and may report the aggregated service interruption time as the service interruption measurement.

In some aspects, the end-to-end UE-side reduced capability duration on the source base station's link (shown by reference number 740 of FIG. 7) may be given by T6-T5, wherein T5 corresponds to one of: the reception of the MBB HO command for an MBB non-conditional HO; or the decision to execute an MBB conditional HO and the transmission of a notification to the source base station regarding CHO execution. T5 may be determined by the UE, the source base station, or the target base station. T6 may correspond to a time at which RACH is successful on the target cell, and can be determined by the UE or the target base station.

In some aspects, the end-to-end UE-side reduced capability duration on the target base station's link (shown by reference number 750 of FIG. 7) may be given by T7-T6, wherein T7 corresponds to a successful transmission of an RRC Reconfiguration Complete to the target base station to indicate the release of the source connection.

In some aspects, an overall UE-side reduced capability duration may be given by T7-T5, which can be determined using a UE based solution (e.g., wherein the UE measures and reports T5, T6, and T7), or a hybrid solution (e.g., wherein the UE determines and reports T5 to the source base station or the target base station, and the source base station or the target base station determines T6 and T7).

Some techniques and apparatuses described herein may be used to determine a service interruption associated with an RRC reestablishment. For example, the UE may trigger RRC Re-establishment in RRC Connected mode because of radio link failure (RLF) on the source cell, a HO failure, an MR-DC HO failure, a CHO failure, an MBB HO failure (e.g., when both cells fail), and/or the like. In the case of RRC Re-establishment, the mobility interruption experienced may be higher than in other HO cases. In this case, the UE-side service interruption for the uplink and the downlink may be measured by the UE, and may be equal to T9-T8, wherein T8 corresponds to a time when the UE declares RLF and starts cell selection, and T9 corresponds to a time when the UE successfully sends an RRC Reestablishment Complete or RRC Setup complete message to the new cell.

As indicated above, FIG. 8 is provided as one or more examples. Other examples may differ from what is provided with regard to FIG. 8.

FIGS. 9-17 are diagrams illustrating examples 900, 1000, 1100, 1200, 1300, 1400, 1500, 1600, and 1700 of signaling for service interruption measurement, in accordance with various aspects of the present disclosure. Examples 900, 1000, 1100, 1200, and 1300 relate to signaling for the determination of UE-side service interruptions, whereas examples 1400, 1500, 1600, and 1700 relate to signaling for the determination of network-side service interruptions.

Figure 9:
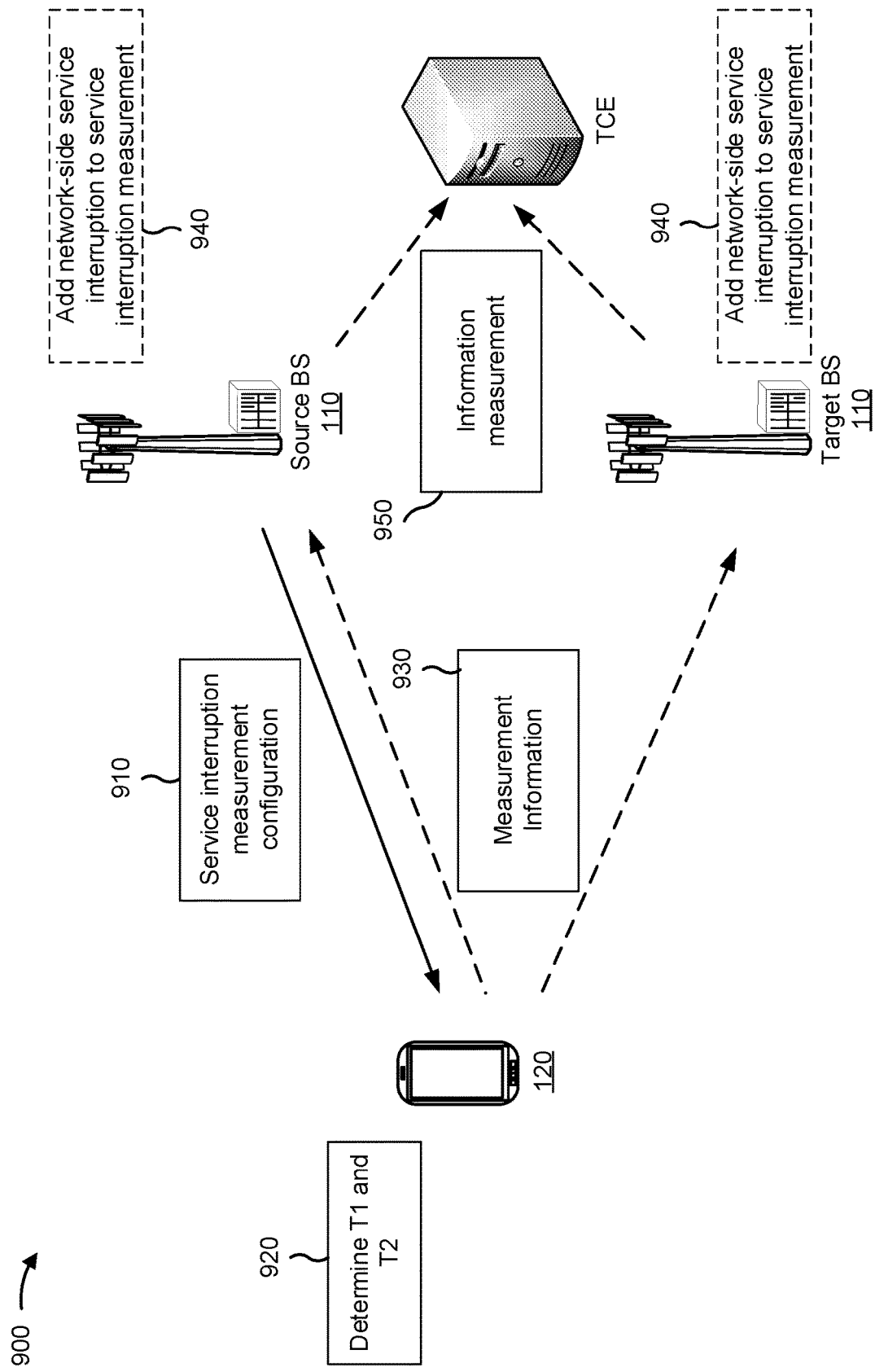
FIGS. 9-17 are diagrams illustrating signaling for service interruption measurement, in accordance with various aspects of the present disclosure.

Example 900, shown in FIG. 9, is an example wherein a UE determines the UE-side service interruption. The UE 120 may receive a service interruption measurement configuration from the source BS 110 or from the target BS 110 (not shown in FIG. 9). In some aspects, the source BS 110 or the target BS 110 may be referred to as network nodes. In some aspects, the source BS 110 and/or the target BS 110 may include an integrated access and backhaul (IAB) node and/or another type of network node.

The measurement configuration may include information for determining the service interruption. In some aspects, the measurement configuration may include an immediate measurement configuration, based at least in part on which the UE 120 may perform a service interruption measurement after each configured handover occurrence. In this case, the UE 120 may be configured with the immediate measurement configuration via an RRC reconfiguration message with synchronization information or via a handover measurement configuration. In some aspects, the measurement configuration may relate to a one-time service interruption measurement. In some aspects, the measurement configuration may relate to multiple service interruption measurements. For example, the measurement configuration may identify a configured area (e.g., a list of cells, a list of tracking areas, etc.), a configured time period, a configured handover time, and/or the like, for which the UE 120 is to perform a service interruption measurement.

In some aspects, the measurement configuration may indicate that the UE 120 is to perform a logged measurement. For example, the UE 120 may log service interruption measurements, and may report a log of the service interruption measurements to the network. In this case, the UE 120 may receive the measurement configuration information via a logged measurement configuration that is specified as relevant to the service interruption measurement or via an RRC reconfiguration message that is specified as relevant to the service interruption measurement. In some aspects, the measurement configuration may identify a configured area (e.g., a list of cells, a list of tracking areas, etc.), a configured time period, a configured handover time, and/or the like, for which the UE 120 is to log the service interruption measurement.

In some aspects, the UE 120 may determine T1 and T2, as shown by reference number 910. In some aspects, the UE 120 may determine the service interruption measurement (e.g., T2-T1) using T1 and T2. In some aspects, the UE 120 may determine and store T1 and/or T2. In other words, the UE 120 may determine and store the service interruption measurement or the time values used to determine the service interruption measurement.

As shown by reference number 930, the UE 120 may provide measurement information identifying the service interruption measurement to the source BS 110 and/or the target BS 110. The dashed lines may indicate that the UE 120 may provide the measurement information to either or both of the source BS 110 and the target BS 110. In some aspects, the UE 120 may provide the measurement information using an immediate report (e.g., in connection with determining the service interruption measurement), such as an immediate minimization of drive test (MDT) report and/or the like. For example, the UE 120 may provide the measurement information in an RRC reconfiguration complete message, a dedicated message (e.g., a handover interruption report message), and/or the like. In some aspects, the UE 120 may provide the measurement information using a logged report. For example, the UE 120 may store multiple service interruption measurements, and may provide information identifying the service interruption measurements. In this case, the UE 120 may indicate availability of the logged service interruption measurements using an IE (e.g., a HO Interruption logMeasAvailable IE or a different IE) in an RRC complete message. The BS 110 (e.g., the source BS 110 or the target BS 110) may request that the UE 120 transmit the service interruption measurements (e.g., via RRC signalling). In some aspects, the logged service interruption measurement information may include information identifying a cell identity of the source BS 110, a cell identity of the target BS 110, location information associated with the UE 120, and/or the like.

In some aspects, the measurement information may include mobility event information. Mobility event information may indicate the type of mobility event experienced by the UE 120 in an RRC_Connected state. For example, the mobility event information may identify an event type (e.g., a HO, a master node change, a CHO, an MBB handover, a RACHless HO, a master node change with RACHless HO, an MBB RACHless HO, a RACHless CHO, an RRC reestablishment event, and/or the like). In some aspects, the mobility event information may include source cell information, such as a cell identity, a carrier frequency, a RAT type, numerology information, cell-level/beam level measurement information, location information, and/or the like. In some aspects, the mobility event information may include target cell information, such as a cell identity, a carrier frequency, a RAT type, numerology information, cell-level/beam level measurement information, location information, and/or the like.

In some aspects, the measurement information may include information identifying mobility performance of the UE 120. For example, the measurement information may identify a service interruption time (e.g., for one or more of the event types described above), such as a start time, an end time, an absolute time or time period, an RRC processing delay, a time required to search the target cell, a UE processing delay to tune radio frequency resources for the target cell, a time for fine time tracking and acquiring full timing information of the target cell, a RACH delay (e.g., an interruption uncertainty in acquiring the first available PRACH occasion in the new cell, a time for normal RACH procedure (CBRA or CFRA) completion, an interruption uncertainty in acquiring the first available uplink grant occasion in the new cell during RACH-Less HO, and/or the like), and/or the like.

In some aspects, the information identifying the mobility performance may include information associated with a CHO monitoring period, such as information indicating a start time (e.g., a time when the CHO RRC Reconfiguration message is received by the UE), an end time (e.g., a time when the CHO execution criteria is met for a CHO candidate cell), an absolute time or time period, an RRC processing delay for processing the CHO command and starting to monitor the CHO condition, a CHO target cell list (e.g., a list of cells that satisfy the CHO condition), and/or the like.

In some aspects, the measurement information may include information identifying a reduced capability of the UE 120, such as for MBB HO types. For example, the measurement information may identify a start time of the reduced capability, an end time of the reduced capability, an absolute time or time period of the reduced capability, a source link reduced capability time (e.g., a start time, an end time, an absolute time or time period, an RRC processing delay, a time required to search the target cell, a UE processing delay to tune the radio frequency resources for the target cell, a time for fine time tracking and acquiring full timing information of the target cell, a RACH delay, such as an interruption uncertainty in acquiring the first available PRACH occasion in the new cell or a time for normal RACH procedure (CBRA or CFRA) completion, an interruption uncertainty in acquiring the first available uplink Grant occasion in the new cell during RACHless HO. In some aspects, the measurement information may indicate a target link reduced capability time, such as a start time (e.g., when RACH was successful on the target BS 110), an end time (e.g., when a successful transmission of an RRC reconfiguration complete message to target node to indicate the release of the source connection is performed), an absolute time or time period, and/or the like.

In some aspects, the measurement information may identify an RRC reestablishment interruption time, such as a start time, an end time, an absolute time or time period, a reestablishment cause (e.g., RLF on the source cell, a HO failure, an MR-DC HO failure, a CHO failure, an MBB HO failure (when both cells fail), an RRC connection reconfiguration failure, and/or the like), and/or the like).

As shown by reference number 940, the BS 110 (e.g., the source BS 110 or the target BS 110) may optionally add information identifying a network-side service interruption to the measurement information. For example, the BS 110 may modify the UE-side service interruption measurement to include the network-side service interruption measurement, may add information identifying T3, T4, and/or T5 to the measurement information, and/or the like. As shown by reference number 950, the BS 110 (e.g., the source BS 110 or the target BS 110) may provide the measurement information to a network device, such as a trace collection entity (TCE) for storage and/or analysis.

Figure 10:
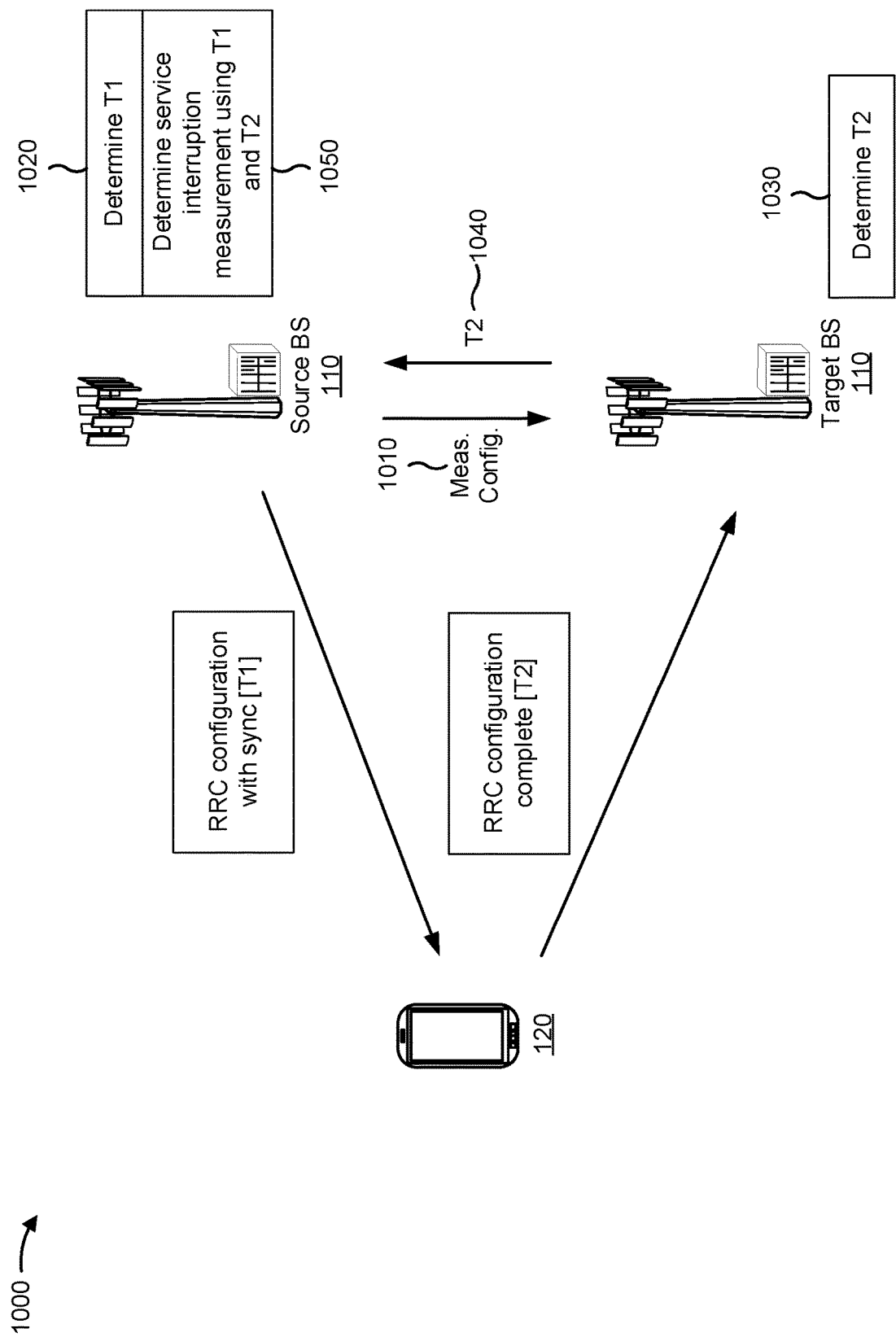

Example 1000, shown in FIG. 10, is an example wherein the source BS 110 determines the service interruption information. In example 1000, T1 is associated with the RRC configuration message to the UE 120 (indicated by T1 being included in brackets in the RRC configuration message) and T2 is associated with the RRC configuration complete message to the target BS 110. As shown by reference number 1010, the source BS 110 may provide a measurement configuration to the target BS 110. In some aspects, the measurement configuration may indicate that the target BS 110 is to determine T2 and provide T2 to the source BS 110. In some aspects, the measurement configuration may be at a per-UE level, meaning that the measurement configuration may indicate that the target BS 110 is to determine measurement information for a particular UE (e.g., using an Xn handover request message, a handover required message, an N2 handover request message, and/or the like). In this case, the target BS 110 may provide a handover request acknowledgment indicating that the target BS 110 supports determination of the measurement information. In some aspects, the measurement configuration may be at a per-node level. For example, the measurement configuration may be performed using a RAN configuration update procedure, an uplink/downlink RAN configuration transfer, and/or the like.

As shown by reference number 1020, the source BS 110 may determine T1. As shown by reference number 1030, the target BS 110 may determine T2. As shown by reference number 1040, the target BS 110 may provide information identifying T2 to the source BS 110. For example, at the per-UE level of measurement configuration, the target BS 110 may determine and report T2 upon receiving an RRC Reconfiguration Complete message from the UE 120. At the per-node level of measurement configuration, the target BS 110 may report T2 at a pre-configured report interval. In some aspects, the target BS 110 may provide an Xn or N2 message indicating a UE arrival time report that identifies T2. As shown by reference number 1050, the source BS 110 may determine the service interruption measurement using T1 and T2 (e.g., T2-T1).

Figure 11:
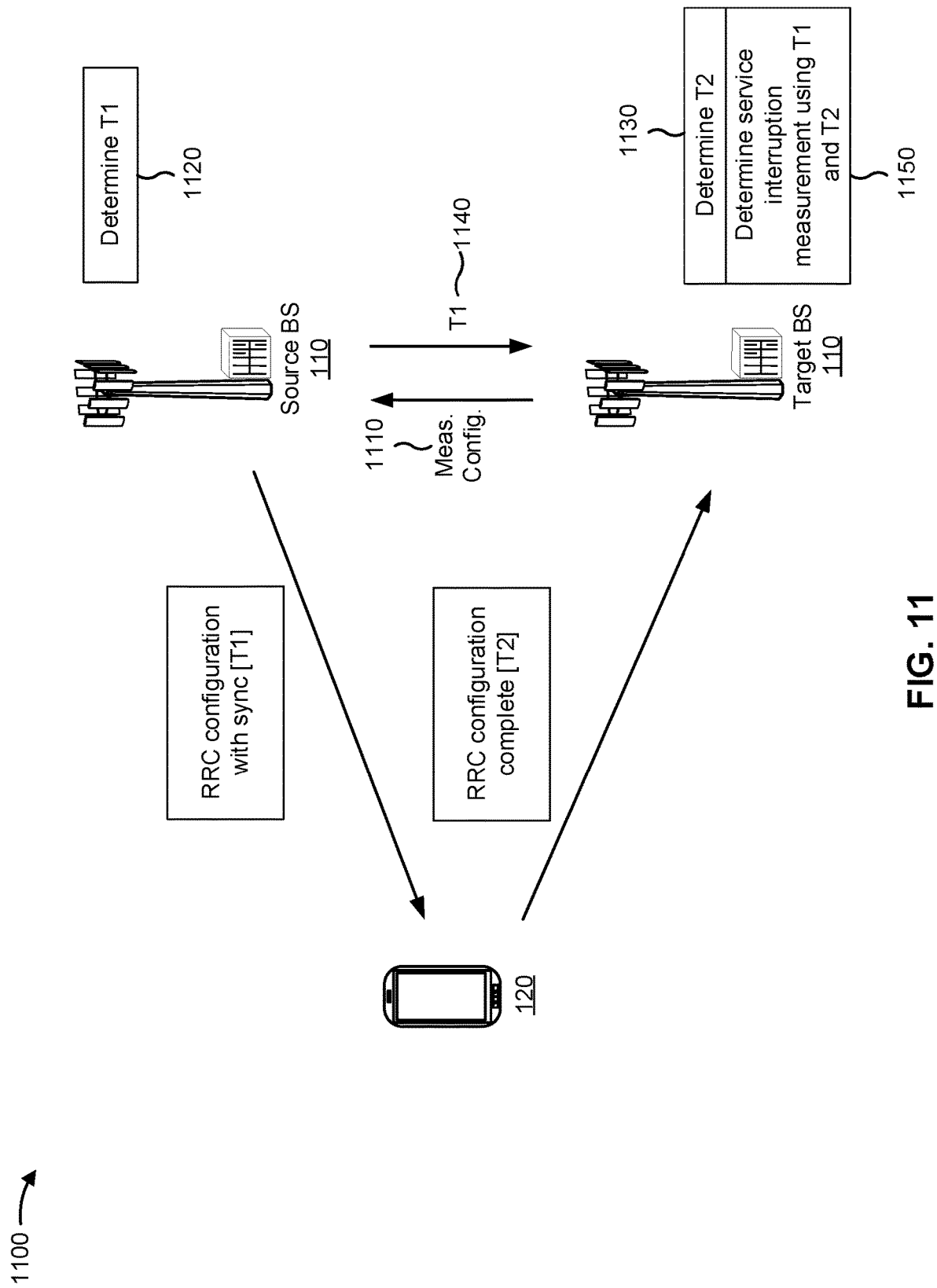

Example 1100, shown in FIG. 11, is an example wherein the target BS 110 determines the service interruption information. In example 1100, T1 is associated with the RRC configuration message to the UE 120 (indicated by T1 being included in brackets in the RRC configuration message) and T2 is associated with the RRC configuration complete message to the target BS 110. As shown by reference number 1110, the target BS 110 may provide a measurement configuration to the target BS 110. In some aspects, the measurement configuration may indicate that the source BS 110 is to determine T1 and provide T1 to the target BS 110. In some aspects, the measurement configuration may be at a per-UE level, meaning that the measurement configuration may indicate that the source BS 110 is to determine measurement information for a particular UE (e.g., using an Xn handover request message, a handover required message, an N2 handover request message, and/or the like). In this case, the source BS 110 may provide a handover request acknowledgment indicating that the source BS 110 supports determination of the measurement information. In some aspects, the measurement configuration may be at a per-node level. For example, the measurement configuration may be performed using a RAN configuration update procedure, an uplink/downlink RAN configuration transfer, and/or the like.

As shown by reference number 1120, the source BS 110 may determine T1. As shown by reference number 1130, the target BS 110 may determine T2. As shown by reference number 1140, the source BS 110 may provide information identifying T1 to the target BS 110. For example, at the per-UE level of measurement configuration, the source BS 110 may determine and report T1 upon transmitting an RRC reconfiguration with sync message to the UE 120. In some aspects, the source BS 110 may report T1 using a secondary node (SN) status transfer, a handover start time report, and/or the like. At the per-node level of measurement configuration, the source BS 110 may report T1 at a pre-configured report interval. In some aspects, the source BS 110 may provide an Xn or N2 message indicating a UE arrival time report that identifies T1. As shown by reference number 1150, the target BS 110 may determine the service interruption measurement using T1 and T2 (e.g., T2-T1).

Figure 12:
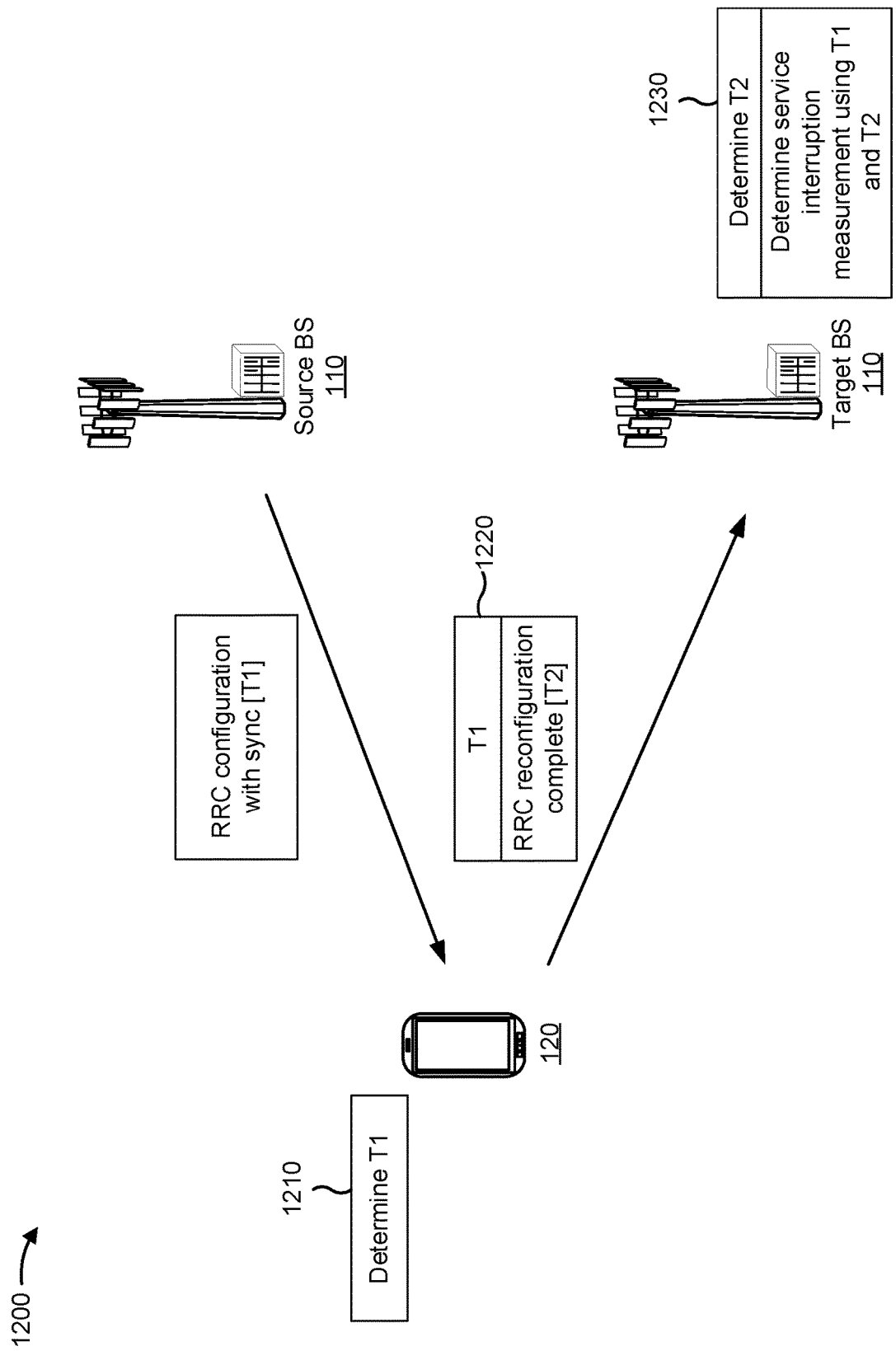

Example 1200, in FIG. 12, is an example of a hybrid method wherein the UE 120 determines a first time value and the target BS 110 determines a second time value. As shown by reference number 1210, the UE 120 may determine T1. In some aspects, the UE 120 may determine T1 based at least in part on a measurement configuration (not shown in FIG. 12). As shown by reference number 1220, the UE 120 may report T1 to the target BS 110 (e.g., using RRC signaling, such as via the RRC reconfiguration complete message or a different RRC message). As shown by reference number 1230, the target BS 110 may determine T2 and may determine the service interruption measurement using T1 and T2.

Figure 13:
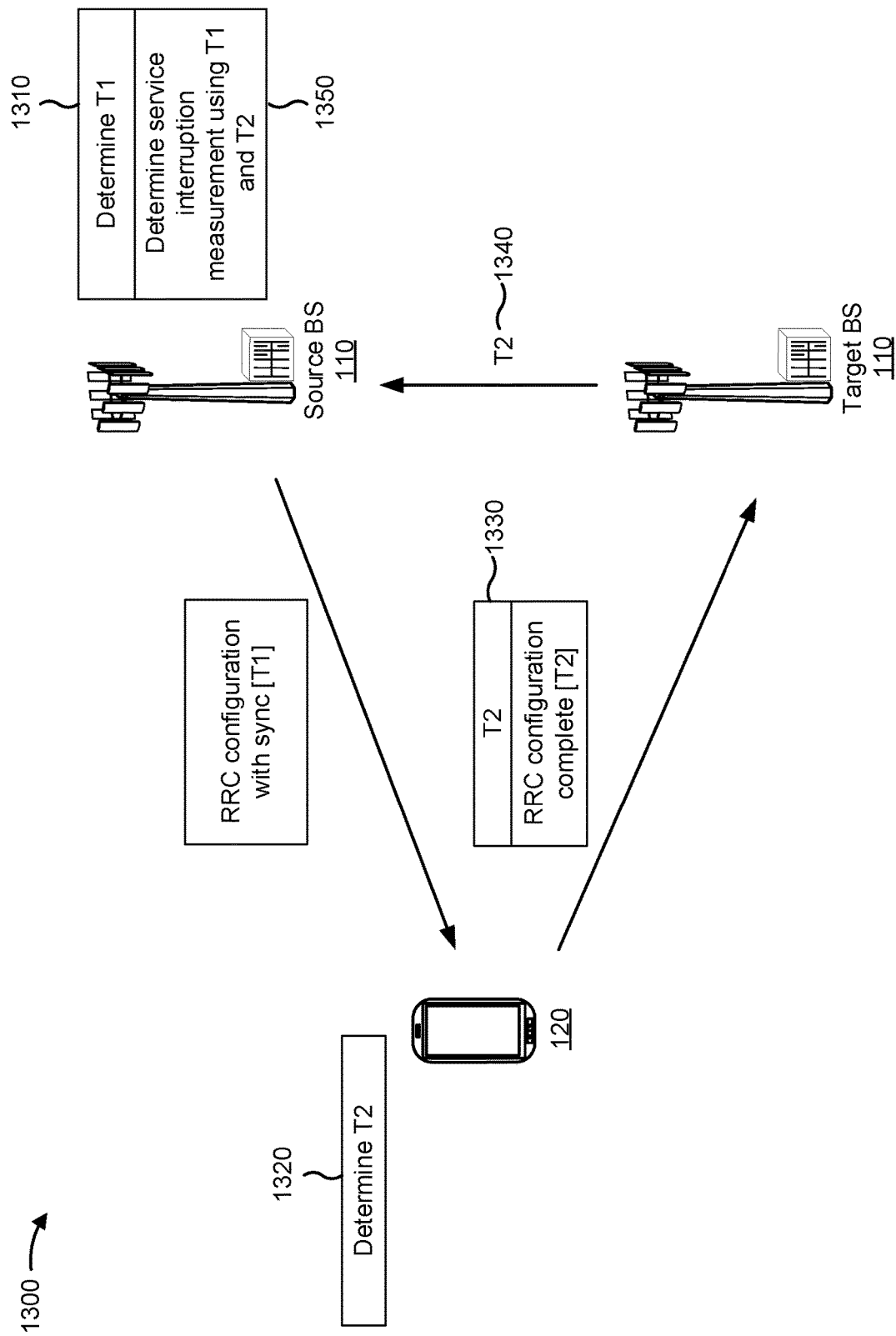

Example 1300, in FIG. 13, is an example of a hybrid method wherein the source BS 110 determines a first time value and the UE 120 determines a second time value. As shown by reference number 1310, the source BS 110 may determine T1. As shown by reference number 1320, the UE 120 may determine T2. As shown by reference number 1330, the UE 120 may report T2 to the target BS 110. As shown by reference number 1340, the target BS 110 may report T2 to the source BS 110. As shown by reference number 1350, the source BS 110 may determine the service interruption measurement using T1 and T2.

Figure 14:
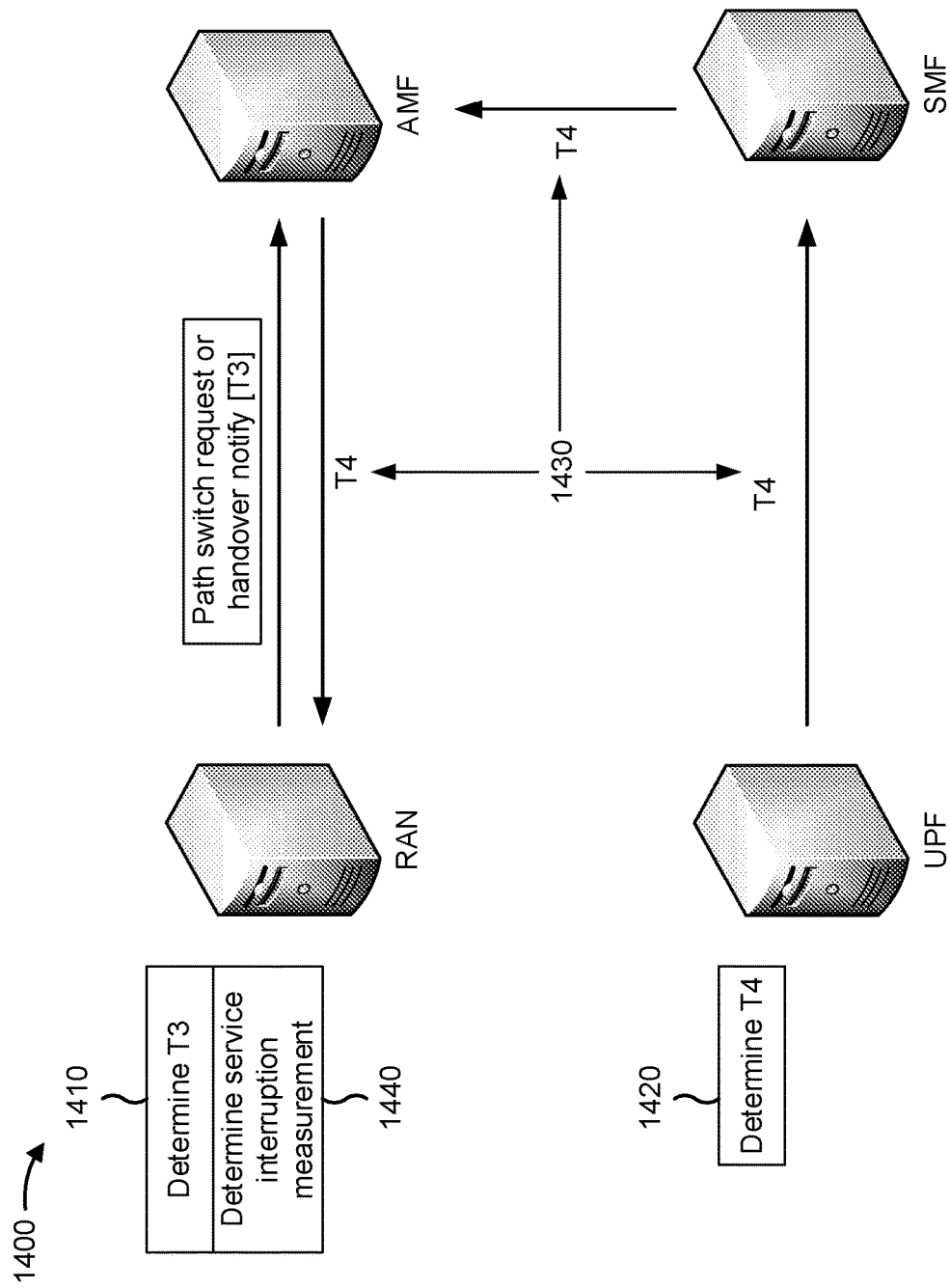

Example 1400, in FIG. 14, is an example of determination of a network-side service interruption measurement by a RAN (e.g., a BS 110). As shown in FIG. 14, and by reference number 1410, the RAN may determine T3, which is described in more detail in connection with FIG. 4. As shown by reference number 1420, a UPF may determine T4, which is also described in more detail in connection with FIG. 4. As shown by reference number 1430, the UPF may provide information identifying T4 to the RAN (e.g., via the SMF and/or the AMF), for example, using a path switch acknowledgment, an N2 message, and/or the like. As shown by reference number 1440, the RAN may determine the network-side service interruption measurement.

Figure 15:
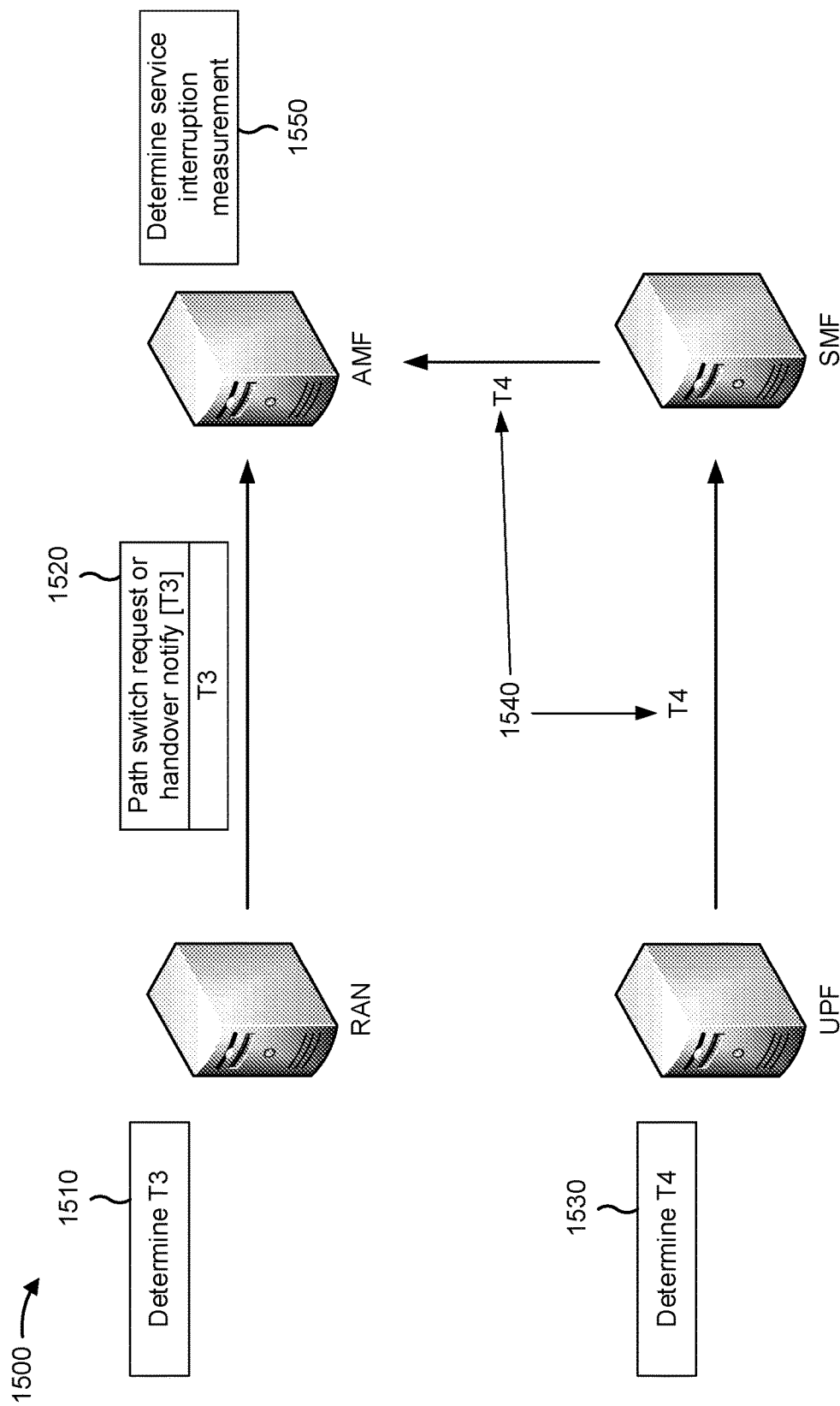

Example 1500, in FIG. 15, is an example of determination of a network-side service interruption measurement by an AMF. As shown by reference number 1510, the RAN (e.g., a BS 110) may determine T3. As shown by reference number 1520, the RAN may provide information identifying T3 to the AMF. For example, the RAN may provide the information identifying T3 in association with a path switch request that was used to determine T3. As shown by reference number 1530, the UPF may determine T4. As shown by reference number 1540, the UPF may provide information identifying T4 to the AMF (e.g., via the SMF). For example, the UPF may provide information identifying T4 in an N4 session modification response, a PDU session update SM context response, and/or the like. As shown by reference number 1550, the AMF may determine the service interruption measurement using N3 and N4.

Figure 16:
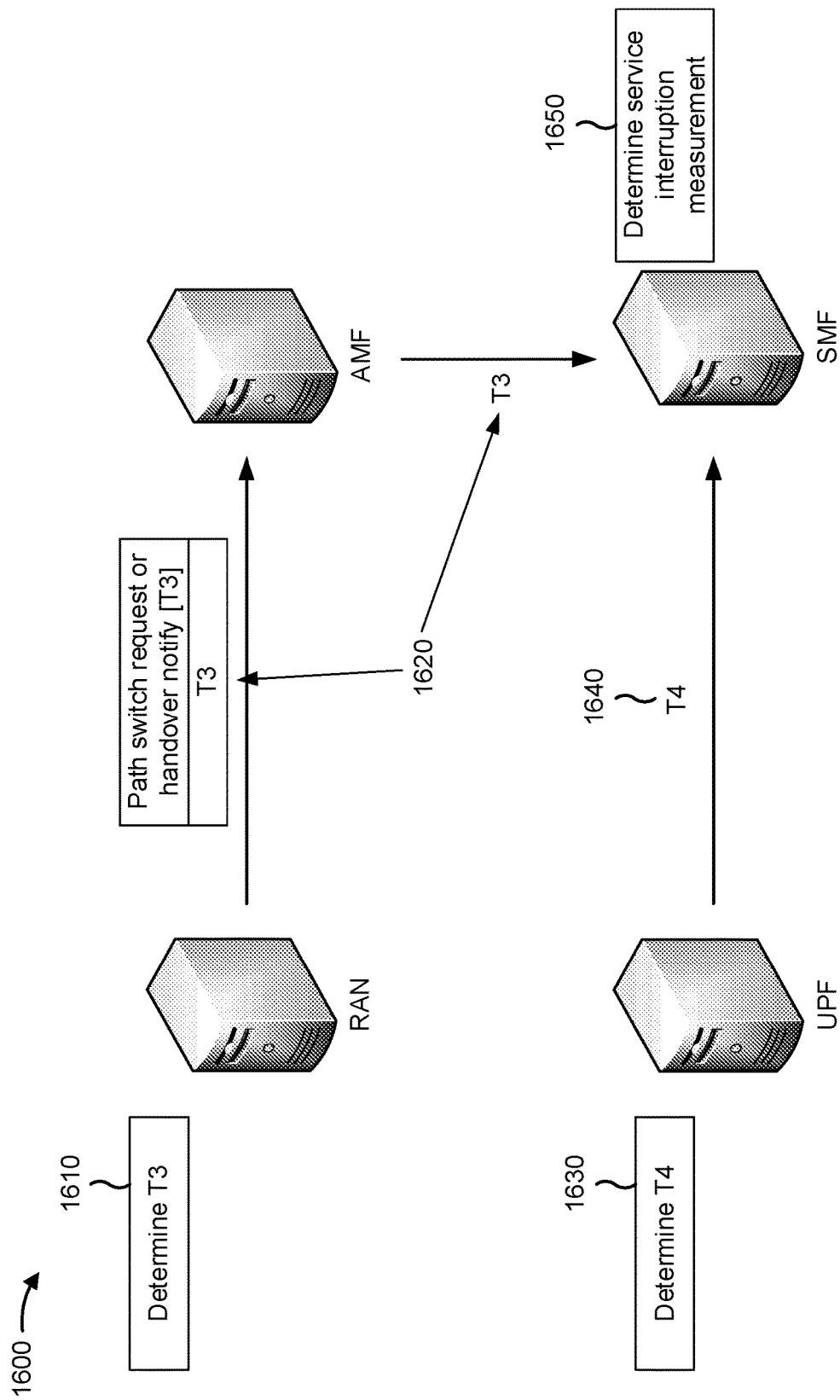

Example 1600, in FIG. 16, is an example of determination of a network-side service interruption measurement by an SMF. As shown by reference number 1610, the RAN (e.g., a BS 110) may determine T3. As shown by reference number 1620, the RAN may provide T3 to the SMF (e.g., via the AMF and/or in a path switch request). As shown by reference number 1630, the UPF may determine T4. As shown by reference number 1640, the UPF may provide information identifying T4 (e.g., in an N4 session modification response and/or the like) to the SMF. As shown by reference number 1650, the SMF may determine the service interruption measurement using T3 and T4.

Figure 17:
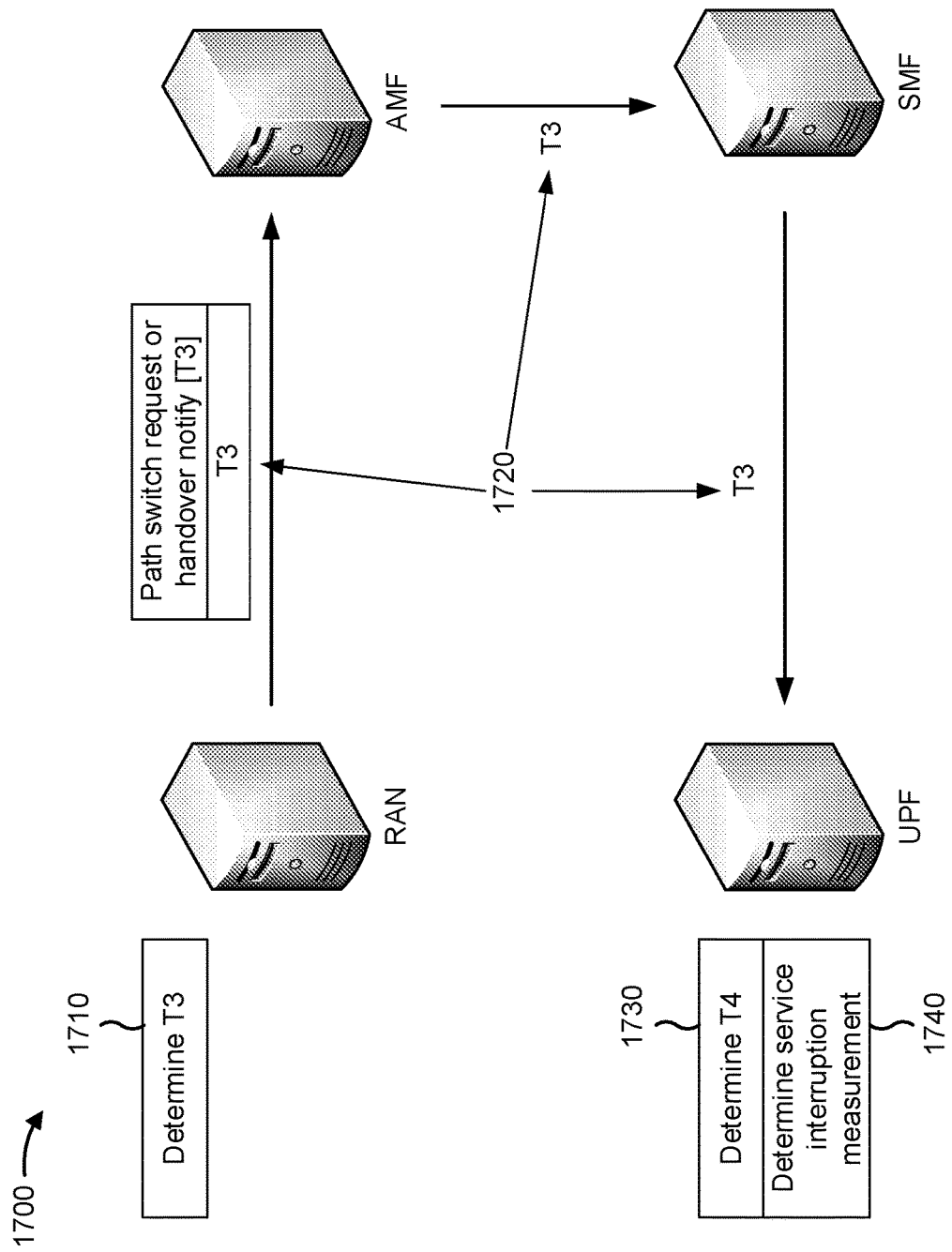

Example 1700, in FIG. 17, is an example of determination of a network-side service interruption measurement by a UPF. As shown by reference number 1710, the RAN (e.g., a BS 110) may determine T3. As shown by reference number 1720, the RAN may provide information identifying T3 to the UPF (e.g., via the AMF and/or the SMF and/or in association with a path switch request, a PDU session update SM context request message, and/or the like. As shown by reference number 1730, the UPF may determine T4. As shown by reference number 1740, the UPF may determine the service interruption measurement using T3 and T4.

The techniques described above can also be applied for multi-RAN dual-connectivity (MR-DC) handover. In this case, the end-to-end service interruption for an SN addition, SN change, or SN release may be the UE-side service interruption. Thus, the techniques described above for determining T1 and T2 in the context of a HO are applicable. The end-to-end service interruption measurement for mobility from dual-connectivity to single-connectivity, or from single-connectivity to dual-connectivity, with a master node (MN) change may be performed using the techniques described above for determining T1 and T2 in the context of the handover with single connectivity. For example, the end-to-end uplink service interruption may be equal to the UE-side service interruption. As another example, the end-to-end downlink HO interruption with downlink data forwarding may be equal to the UE-side service interruption (e.g., T2-T1). As yet another example, the end-to-end downlink HO interruption without downlink data forwarding may be equal to the UE-side service interruption plus the network-side downlink interruption (e.g., (T2-T1)+(T4-T3)). In this case, the UE-side service interruption can be measured by the UE or by a BS. Furthermore, the determination of the service interruption measurement can be performed by the UE 120, the BS 110, or a combination of the UE 120 and the BS 110 (e.g., a hybrid method).

As indicated above, FIGS. 9-17 are provided as examples. Other examples may differ from what is provided with regard to FIGS. 9-17.

Figure 18:
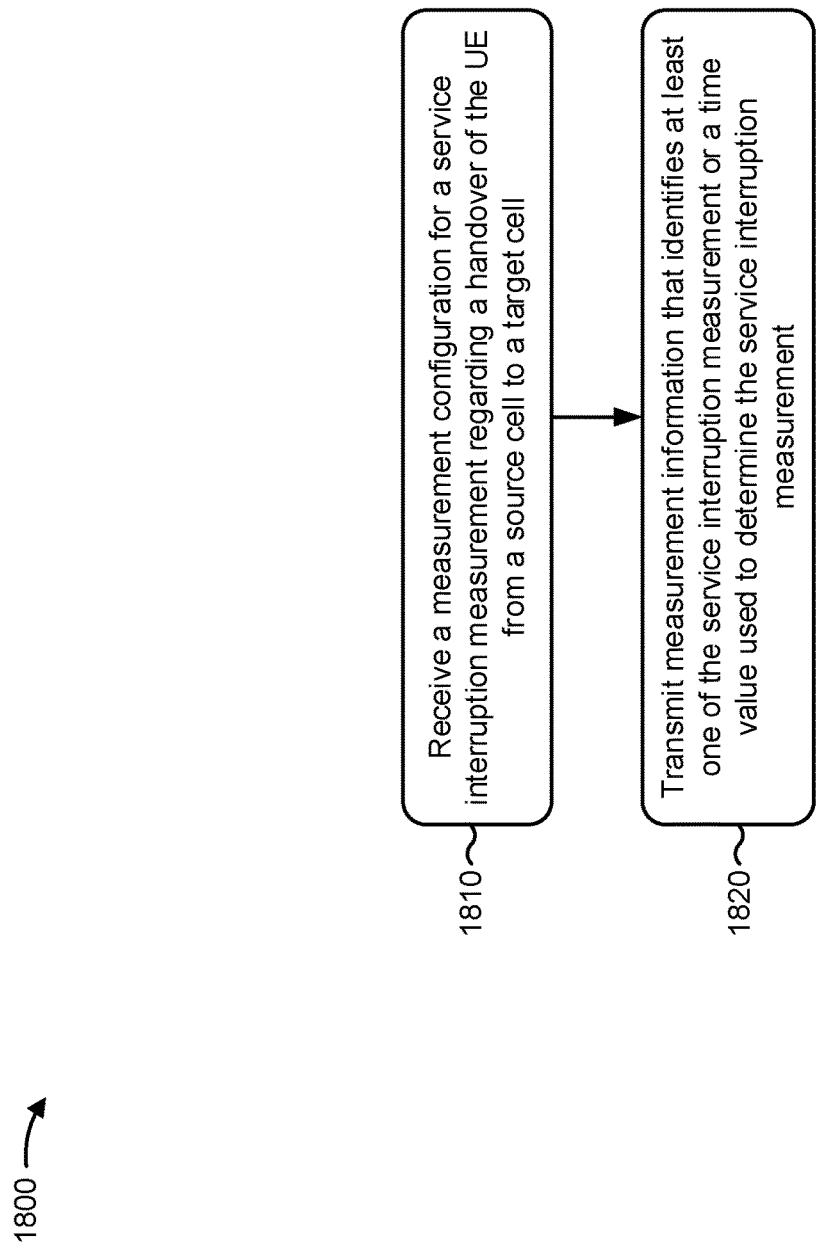
FIG. 18 is a diagram illustrating an example process performed, for example, by a user equipment, in accordance with various aspects of the present disclosure.

FIG. 18 is a diagram illustrating an example process 1800 performed, for example, by a UE, in accordance with various aspects of the present disclosure. Example process 1800 is an example where a UE (e.g., UE 120 and/or the like) performs operations associated with service interruption measurement.

As shown in FIG. 18, in some aspects, process 1800 may include receiving a measurement configuration for a service interruption measurement regarding a handover of the UE from a source cell to a target cell (block 1810). For example, the UE (e.g., using antenna 252, DEMOD 254, MIMO detector 256, receive processor 258, controller/processor 280, and/or the like) may receive a measurement configuration for a service interruption measurement regarding a handover of the UE from a source cell to a target cell, as described above.

As further shown in FIG. 18, in some aspects, process 1800 may include transmitting measurement information that identifies at least one of the service interruption measurement or a time value used to determine the service interruption measurement (block 1820). For example, the UE (e.g., using controller/processor 280, transmit processor 264, TX MIMO processor 266, MOD 254, antenna 252, and/or the like) may transmit measurement information that identifies at least one of the service interruption measurement or a time value used to determine the service interruption measurement, as described above.

Process 1800 may include additional aspects, such as any single aspect or any combination of aspects described below and/or in connection with one or more other processes described elsewhere herein.

In a first aspect, the time value corresponds to a start of a service interruption of the handover.

In a second aspect, alone or in combination with the first aspect, the UE may determine the time value in connection with receiving a handover command from the source cell.

In a third aspect, alone or in combination with one or more of the first and second aspects, the time value corresponds to an end of a service interruption of the handover.

In a fourth aspect, alone or in combination with one or more of the first through third aspects, the UE may determine the time value in connection with transmitting a radio resource control reconfiguration complete message associated with the handover.

In a fifth aspect, alone or in combination with one or more of the first through fourth aspects, the measurement information identifies a first time value corresponding to a start of a service interruption of the handover and a second time value corresponding to an end of the service interruption of the handover, wherein the time value is one of the first time value or the second time value.

In a sixth aspect, alone or in combination with one or more of the first through fifth aspects, the measurement configuration is received via at least one of: a radio resource control reconfiguration message, or a message associated with synchronization information.

In a seventh aspect, alone or in combination with one or more of the first through sixth aspects, the measurement configuration indicates that the measurement information is to be determined for a single handover.

In an eighth aspect, alone or in combination with one or more of the first through seventh aspects, the measurement configuration indicates one or more conditions for determining the measurement information.

In a ninth aspect, alone or in combination with one or more of the first through eighth aspects, the one or more conditions include at least one of: a cell identity of the source cell or the target cell, a tracking area of the UE, a time period in which the measurement information is valid, or a handover time of the handover.

In a tenth aspect, alone or in combination with one or more of the first through ninth aspects, the UE may determine measurement information for multiple handovers, wherein transmitting the measurement information further comprises transmitting the measurement information for the multiple handovers.

In an eleventh aspect, alone or in combination with one or more of the first through tenth aspects, the measurement configuration is provided using radio resource control signaling as a logged measurement configuration.

In a twelfth aspect, alone or in combination with one or more of the first through eleventh aspects, the measurement configuration is provided using a radio resource control reconfiguration message with a logged measurement configuration.

In a thirteenth aspect, alone or in combination with one or more of the first through twelfth aspects, the service interruption measurement identifies a length of time between a time at which the UE stops reception from the source cell and a time at which the UE transmits a reconfiguration complete message to the target cell.

In a fourteenth aspect, alone or in combination with one or more of the first through thirteenth aspects, the measurement information is transmitted using control plane signaling.

In a fifteenth aspect, alone or in combination with one or more of the first through fourteenth aspects, the measurement information is transmitted using a minimization of drive test report.

In a sixteenth aspect, alone or in combination with one or more of the first through fifteenth aspects, the UE may transmit an indication that the measurement information is available, wherein transmitting the measurement information is based at least in part on receiving a request for the measurement information based at least in part on the indication.

In a seventeenth aspect, alone or in combination with one or more of the first through sixteenth aspects, the handover comprises a conditional handover. In some aspects, the time value is a starting time value. In some aspects, the starting time value indicates a time at which the UE initiates the handover based at least in part on a conditional handover condition being met.

In an eighteenth aspect, alone or in combination with one or more of the first through seventeenth aspects, the handover comprises a conditional handover. In some aspects, the time value is an ending time value. In some aspects, the ending time value indicates a time at which the UE transmits an indication that the UE has initiated the handover.

In a nineteenth aspect, alone or in combination with one or more of the first through eighteenth aspects, the service interruption measurement identifies a time length of a reduced capability of the UE in connection with the handover.

In a twentieth aspect, alone or in combination with one or more of the first through nineteenth aspects, when the handover comprises a make-before-break handover, the service interruption measurement identifies a time length of a reduced capability of the UE in connection with the handover.

In a twenty first aspect, alone or in combination with one or more of the first through twentieth aspects, the time value corresponds to a time at which the UE receives a handover command or a time at which the UE transmits an indication that the UE has initiated the handover.

In a twenty second aspect, alone or in combination with one or more of the first through twenty first aspects, the time value corresponds to a time at which the UE receives a make-before-break handover command or a time at which the UE determines to execute a conditional make-before-break handover and the UE transmits an indication regarding the conditional make-before-break handover to the source cell or the target cell.

In a twenty third aspect, alone or in combination with one or more of the first through twenty second aspects, when the UE does not support simultaneous transmission to the source cell and the target cell, the measurement information identifies an aggregated length of time for which the UE was tuned to the target cell in connection with the handover.

In a twenty fourth aspect, alone or in combination with one or more of the first through twenty third aspects, the handover comprises a make-before-break handover. In some aspects, the UE tunes to the target cell in connection with the handover to perform a random access procedure.

In a twenty fifth aspect, alone or in combination with one or more of the first through twenty fourth aspects, the time value corresponds to a time at which the UE determines that a random access procedure is successful on the target cell.

In a twenty sixth aspect, alone or in combination with one or more of the first through twenty fifth aspects, the time value corresponds to a time at which the UE transmits a reconfiguration complete message to the target cell.

In a twenty seventh aspect, alone or in combination with one or more of the first through twenty sixth aspects, the service interruption measurement relates to a service interruption associated with a radio resource control reestablishment procedure.

In a twenty eighth aspect, alone or in combination with one or more of the first through twenty seventh aspects, the time value identifies a time at which the UE declares radio link failure.

In a twenty ninth aspect, alone or in combination with one or more of the first through twenty eighth aspects, the time value identifies a time at which the UE successfully transmits a radio resource control reestablishment complete message.

In a thirtieth aspect, alone or in combination with one or more of the first through twenty ninth aspects, the measurement information indicates a cause associated with the service interruption measurement.

In a thirty first aspect, alone or in combination with one or more of the first through thirtieth aspects, the measurement information identifies an event type associated with the service interruption measurement.

In a thirty second aspect, alone or in combination with one or more of the first through thirty first aspects, the measurement information includes information identifying the source cell or information identifying the target cell.

In a thirty third aspect, alone or in combination with one or more of the first through thirty second aspects, the measurement information identifies one or more delay times associated with the service interruption.

In a thirty fourth aspect, alone or in combination with one or more of the first through thirty third aspects, the measurement information identifies a service interruption measurement for the source cell and a service interruption measurement for the target cell.

In a thirty fifth aspect, alone or in combination with one or more of the first through thirty fourth aspects, the measurement information includes at least one of information indicating a conditional handover monitoring period associated with the handover, information indicating a conditional handover command processing delay associated with the handover, or information indicating a set of target cells for the handover.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
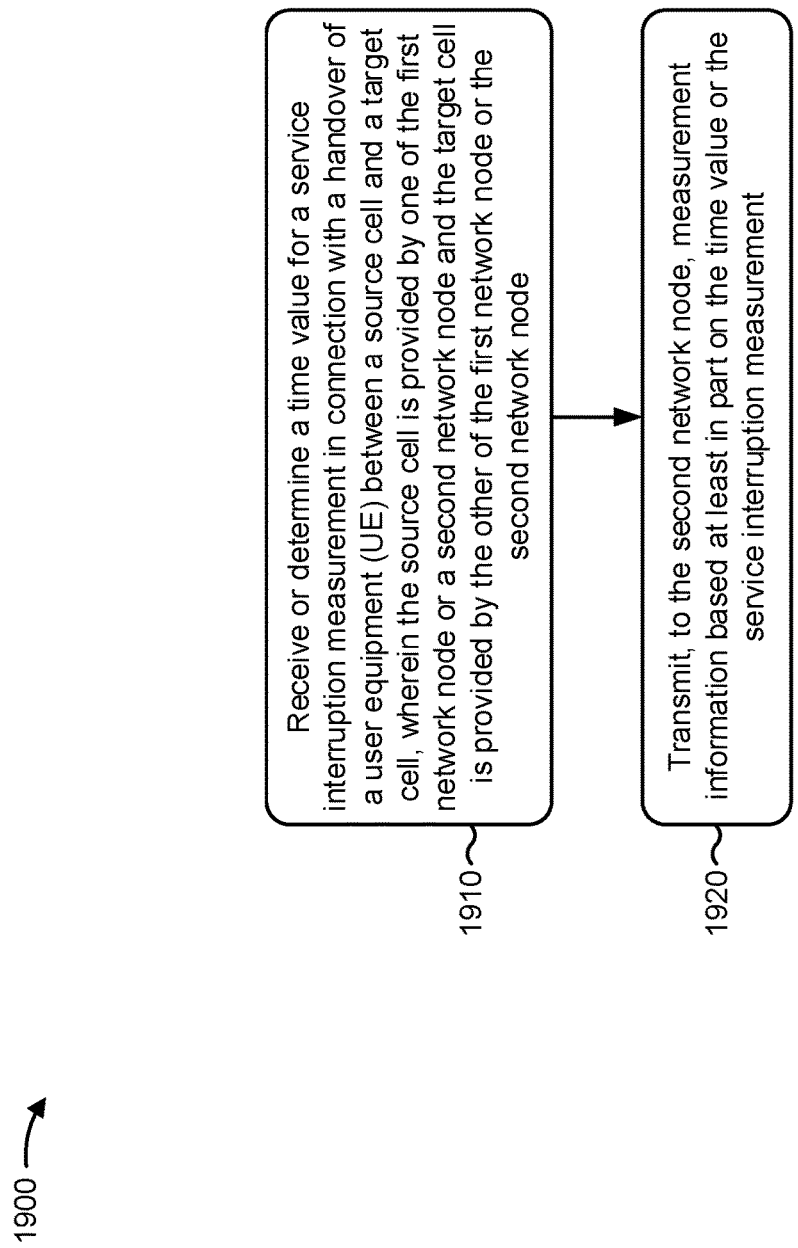
FIG. 19 is a diagram illustrating an example process performed, for example, by a first network node, in accordance with various aspects of the present disclosure.

FIG. 19 is a diagram illustrating an example process 1900 performed, for example, by a first network node, in accordance with various aspects of the present disclosure. Example process 1900 is an example where a first network node (e.g., BS 110, and/or the like) performs operations associated with service interruption measurement.

As shown in FIG. 19, in some aspects, process 1900 may include receiving or determining a time value for a service interruption measurement in connection with a handover of a user equipment (UE) between a source cell and a target cell, wherein the source cell is provided by one of the first network node or a second network node and the target cell is provided by the other of the first network node or the second network node (block 1910). For example, the first network node (e.g., using antenna 234, DEMOD 232, MIMO detector 236, receive processor 238, controller/processor 240, and/or the like) may receive or determine a time value for a service interruption measurement in connection with a handover of a UE between a source cell and a target cell, as described above. In some aspects, the source cell is provided by one of the first network node or a second network node and the target cell is provided by the other of the first network node or the second network node.

As further shown in FIG. 19, in some aspects, process 1900 may include transmitting, to the second network node, measurement information based at least in part on the time value or the service interruption measurement (block 1920). For example, the first network node (e.g., using controller/processor 240, transmit processor 220, TX MIMO processor 230, MOD 232, antenna 234, and/or the like) may transmit, to the second network node, measurement information based at least in part on the time value or the service interruption measurement, as described above.

Process 1900 may include additional aspects, such as any single aspect or any combination of aspects described below and/or in connection with one or more other processes described elsewhere herein.

In a first aspect, the time value corresponds to a start of a service interruption of the handover.

In a second aspect, alone or in combination with the first aspect, the first network node may determine the time value in connection with transmitting a radio resource control reconfiguration message to the UE.

In a third aspect, alone or in combination with one or more of the first and second aspects, the time value corresponds to an end of a service interruption of the handover.

In a fourth aspect, alone or in combination with one or more of the first through third aspects, the first network node may determine the time value in connection with receiving a radio resource control reconfiguration complete message associated with the handover.

In a fifth aspect, alone or in combination with one or more of the first through fourth aspects, the first network node may receive, from the second network node, an indication to determine the time value; and transmit, to the second network node, an acknowledgment indicating that the first network node supports the determination of the time value.

In a sixth aspect, alone or in combination with one or more of the first through fifth aspects, the first network node may receive configuration information including a measurement configuration for determining the measurement information, wherein determining the measurement information is based at least in part on the measurement configuration.

In a seventh aspect, alone or in combination with one or more of the first through sixth aspects, the measurement information identifies a first time value corresponding to a start of a service interruption of the handover and a second time value corresponding to an end of the service interruption of the handover. In some aspects, the time value is one of the first time value or the second time value.

In an eighth aspect, alone or in combination with one or more of the first through seventh aspects, the first network node is a source node of the handover and the second network node is a target node of the handover.

In a ninth aspect, alone or in combination with one or more of the first through eighth aspects, the first network node is a target node of the handover and the second network node is a source node of the handover.

In a tenth aspect, alone or in combination with one or more of the first through ninth aspects, the time value is a first time value. In some aspects, the method further comprises: receiving information identifying a second time value from the UE; and determining the measurement information based at least in part on the first time value and the second time value.

In an eleventh aspect, alone or in combination with one or more of the first through tenth aspects, the time value is determined for a single handover.

In a twelfth aspect, alone or in combination with one or more of the first through eleventh aspects, the service interruption measurement relates to a network-side service interruption associated with the handover.

In a thirteenth aspect, alone or in combination with one or more of the first through twelfth aspects, the service interruption measurement relates to a UE-side service interruption associated with the handover.

In a fourteenth aspect, alone or in combination with one or more of the first through thirteenth aspects, the handover comprises a conditional handover. In some aspects, the time value indicates a time at which the UE initiates the handover based at least in part on a conditional handover condition. In some aspects, information identifying the time value is received from the UE.

In a fifteenth aspect, alone or in combination with one or more of the first through fourteenth aspects, the handover comprises a conditional handover. In some aspects, the time value indicates a time at which the first network node receives an indication that the UE has initiated the handover.

In a sixteenth aspect, alone or in combination with one or more of the first through fifteenth aspects, the handover comprises a conditional handover. In some aspects, the time value indicates a time at which the first network node receives an indication that the UE has completed the handover.

In a seventeenth aspect, alone or in combination with one or more of the first through sixteenth aspects, the service interruption measurement identifies a length of time of a reduced capability of the UE in connection with the handover.

In an eighteenth aspect, alone or in combination with one or more of the first through seventeenth aspects, when the handover comprises a make-before-break handover, the service interruption measurement identifies a length, in time, of a reduced capability of the UE in connection with the handover.

In a nineteenth aspect, alone or in combination with one or more of the first through eighteenth aspects, when the UE does not support simultaneous transmission to the source cell and the target cell, the measurement information identifies an aggregated length of time for which the UE was tuned to the target cell in connection with the handover.

In a twentieth aspect, alone or in combination with one or more of the first through nineteenth aspects, the handover comprises a make-before-break handover. In some aspects, the UE tunes to the target cell in connection with the handover to perform a random access procedure.

In a twenty first aspect, alone or in combination with one or more of the first through twentieth aspects, the service interruption measurement relates to a service interruption associated with a radio resource control reestablishment procedure.

In a twenty second aspect, alone or in combination with one or more of the first through twenty first aspects, the time value identifies a time at which the UE declares radio link failure.

In a twenty third aspect, alone or in combination with one or more of the first through twenty second aspects, the time value identifies a time at which the first network node receives a radio resource control reestablishment complete message.

In a twenty fourth aspect, alone or in combination with one or more of the first through twenty third aspects, the measurement information indicates a cause associated with the service interruption measurement.

In a twenty fifth aspect, alone or in combination with one or more of the first through twenty fourth aspects, the measurement information identifies an event type associated with the service interruption measurement.

In a twenty sixth aspect, alone or in combination with one or more of the first through twenty fifth aspects, the measurement information includes information identifying the source cell or information identifying the target cell.

In a twenty seventh aspect, alone or in combination with one or more of the first through twenty sixth aspects, the measurement information identifies one or more delay times associated with the service interruption.

In a twenty eighth aspect, alone or in combination with one or more of the first through twenty seventh aspects, the measurement information identifies a service interruption measurement for the source cell and a service interruption measurement for the target cell.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
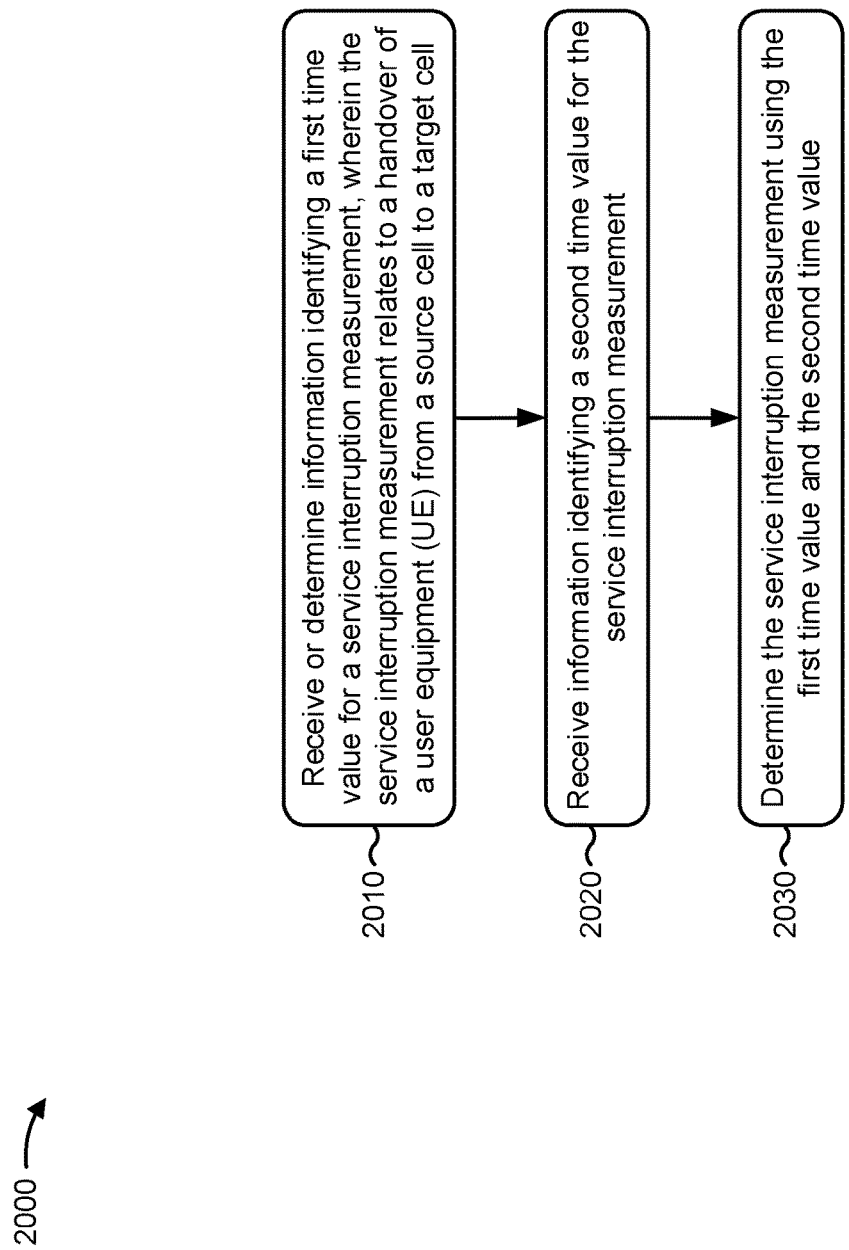
FIG. 20 is a diagram illustrating an example process performed, for example, by a network node, in accordance with various aspects of the present disclosure.

FIG. 20 is a diagram illustrating an example process 2000 performed, for example, by a network node, in accordance with various aspects of the present disclosure. Example process 2000 is an example where a network node (e.g., BS 110 and/or the like) performs operations associated with service interruption measurement.

As shown in FIG. 20, in some aspects, process 2000 may include receiving or determining information identifying a first time value for a service interruption measurement wherein the service interruption measurement relates to a handover of a UE from a source cell to a target cell (block 2010). For example, the network node (e.g., using antenna 234, DEMOD 232, MIMO detector 236, receive processor 238, controller/processor 240, and/or the like) may receive or determine information identifying a first time value for a service interruption measurement, as described above. In some aspects, the service interruption measurement relates to a handover of a UE from a source cell to a target cell.

As further shown in FIG. 20, in some aspects, process 2000 may include receiving information identifying a second time value for the service interruption measurement (block 2020). For example, the network node (e.g., using antenna 234, DEMOD 232, MIMO detector 236, receive processor 238, controller/processor 240, and/or the like) may receive information identifying a second time value for the service interruption measurement, as described above.

As further shown in FIG. 20, in some aspects, process 2000 may include determining the service interruption measurement using the first time value and the second time value (block 2030). For example, the network node (e.g., using controller/processor 240, transmit processor 220, TX MIMO processor 230, MOD 232, antenna 234, and/or the like) may determine the service interruption measurement using the first time value and the second time value, as described above.

Process 2000 may include additional aspects, such as any single aspect or any combination of aspects described below and/or in connection with one or more other processes described elsewhere herein.

In a first aspect, the second time value is received from the UE.

In a second aspect, alone or in combination with the first aspect, the network node is a first network node and the second time value is received from a second network node.

In a third aspect, alone or in combination with one or more of the first and second aspects, the first network node provides the source cell and the second network node provides the target cell.

In a fourth aspect, alone or in combination with one or more of the first through third aspects, the first network node provides the target cell and the second network node provides the source cell.

In a fifth aspect, alone or in combination with one or more of the first through fourth aspects, the first time value is based at least in part on receiving a radio resource control reconfiguration complete message associated with the handover.

In a sixth aspect, alone or in combination with one or more of the first through fifth aspects, the first time value is received in a minimization of drive test report.

In a seventh aspect, alone or in combination with one or more of the first through sixth aspects, the network node may receive, from the UE, an indication that the first time value is available; and transmit a request for the first time value based at least in part on the indication.

In an eighth aspect, alone or in combination with one or more of the first through seventh aspects, the handover comprises a conditional handover. In some aspects, the second time value indicates a time at which the network node receives an indication that the UE has initiated the handover.

In a ninth aspect, alone or in combination with one or more of the first through eighth aspects, the service interruption measurement identifies a time length of a reduced capability of the UE in connection with the handover.

In a tenth aspect, alone or in combination with one or more of the first through ninth aspects, when the handover comprises a make-before-break handover, the service interruption measurement identifies a time length of a reduced capability of the UE in connection with the handover.

In an eleventh aspect, alone or in combination with one or more of the first through tenth aspects, the second time value corresponds to a time at which the UE receives a handover command or a time at which the UE transmits an indication that the UE has initiated the handover.

In a twelfth aspect, alone or in combination with one or more of the first through eleventh aspects, the second time value corresponds to a time at which the UE determines that a random access procedure is successful on the target cell.

In a thirteenth aspect, alone or in combination with one or more of the first through twelfth aspects, the time value corresponds to a time at which the UE transmits a reconfiguration complete message to the target cell.

In a fourteenth aspect, alone or in combination with one or more of the first through thirteenth aspects, the service interruption measurement relates to a service interruption associated with a radio resource control reestablishment procedure.

In a fifteenth aspect, alone or in combination with one or more of the first through fourteenth aspects, the second time value identifies a time at which the UE declares radio link failure.

In a sixteenth aspect, alone or in combination with one or more of the first through fifteenth aspects, the second time value identifies a time at which the UE successfully transmits a radio resource control reestablishment complete message.

In a seventeenth aspect, alone or in combination with one or more of the first through sixteenth aspects, the second time value is received with information that indicates a cause associated with the service interruption measurement.

In an eighteenth aspect, alone or in combination with one or more of the first through seventeenth aspects, the information identifying the first time value is received from a base station in a path switch request.

In a nineteenth aspect, alone or in combination with one or more of the first through eighteenth aspects, the information identifying the second time value is received from a user plane function in a path switch acknowledgment message or a handover notification acknowledgment.

In a twentieth aspect, alone or in combination with one or more of the first through nineteenth aspects, the network node comprises a base station.

In a twenty first aspect, alone or in combination with one or more of the first through twentieth aspects, the network node comprises an access management function.

In a twenty second aspect, alone or in combination with one or more of the first through twenty first aspects, the network node comprises a session management function.

In a twenty third aspect, alone or in combination with one or more of the first through twenty second aspects, the network node comprises a user plane function.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, via a radio resource control reconfiguration message, a measurement configuration for a service interruption measurement regarding a handover of the UE from a source cell to a target cell; and
   transmitting measurement information that identifies at least one of the service interruption measurement or a time value used to determine the service interruption measurement, wherein the service interruption measurement identifies a time length of a reduced capability of the UE in connection with the handover.

2. The method of claim 1, wherein the time value corresponds to a start of a service interruption of the handover or an end of the service interruption of the handover.

3. The method of claim 1, wherein the time value is one of a first time value corresponding to a start of a service interruption of the handover or a second time value corresponding to an end of the service interruption of the handover.

4. The method of claim 1, wherein the measurement configuration indicates that the measurement information is to be determined for a single handover.

5. The method of claim 1, wherein the measurement configuration indicates one or more conditions for determining the measurement information.

6. The method of claim 5, wherein the one or more conditions include at least one of:
a cell identity of the source cell or the target cell,
a tracking area of the UE,
a time period in which the measurement information is valid, or
a handover time of the handover.

7. The method of claim 1, further comprising:
determining measurement information for multiple handovers; and
wherein transmitting the measurement information further comprises:
transmitting the measurement information for the multiple handovers.

8. The method of claim 7, wherein the measurement configuration is provided using the radio resource control reconfiguration message as a logged measurement configuration.

9. The method of claim 7, wherein the measurement configuration is provided using the radio resource control reconfiguration message with a logged measurement configuration.

10. The method of claim 1, further comprising:
transmitting an indication that the measurement information is available,
wherein transmitting the measurement information is based at least in part on receiving a request for the measurement information based at least in part on the indication.

11. The method of claim 1, wherein the handover comprises a conditional handover, wherein the time value is a starting time value, and wherein the starting time value indicates a time at which the UE initiates the handover based at least in part on a conditional handover condition being met.

12. The method of claim 1, wherein the handover comprises a conditional handover, wherein the time value is an ending time value, and wherein the ending time value indicates a time at which the UE transmits an indication that the UE has completed the handover.

13. The method of claim 1, wherein the reduced capability is associated with one of:
the source cell, or
the target cell.

14. The method of claim 1, wherein, when the handover comprises a make-before-break handover, the service interruption measurement identifies the time length of the reduced capability of the UE in connection with the handover.

15. The method of claim 1, wherein, when the UE does not support simultaneous transmission to the source cell and the target cell, the measurement information identifies an aggregated length of time for which the UE was tuned to the target cell in connection with the handover, wherein the handover comprises a make-before-break handover, and wherein the UE tunes to the target cell in connection with the handover to perform a random access procedure.

16. The method of claim 1, wherein the measurement information identifies at least one of:
a cause associated with the service interruption measurement,
an event type associated with the service interruption measurement,
the source cell or information identifying the target cell,
one or more delay times associated with a service interruption,
a service interruption measurement for the source cell and a service interruption measurement for the target cell,
a conditional handover monitoring period associated with the handover,
a conditional handover command processing delay associated with the handover, or
a set of target cells for the handover.

17. The method of claim 1, wherein the service interruption measurement relates to a combination of a UE-side interruption and a network-side interruption, wherein the UE-side interruption comprises a time duration in which the UE cannot exchange user-plane packets.

18. A method of wireless communication performed by a first network node, comprising:
transmitting, to a user equipment (UE) and via a radio resource control reconfiguration message, a measurement configuration for a service interruption measurement regarding a handover of the UE from a source cell to a target cell;
receiving or determining a time value for the service interruption measurement, wherein the source cell is provided by one of the first network node or a second network node and the target cell is provided by the other of the first network node or the second network node; and
transmitting, to the second network node, measurement information based at least in part on the time value or the service interruption measurement, wherein the service interruption measurement identifies a time length of a reduced capability of the UE in connection with the handover.

19. The method of claim 18, wherein the time value corresponds to an end of a service interruption of the handover, and wherein the method further comprises determining the time value in connection with receiving a radio resource control reconfiguration complete message associated with the handover.

20. The method of claim 18, wherein the first network node is a source node of the handover and the second network node is a target node of the handover, or wherein the first network node is the target node of the handover and the second network node is the source node of the handover.

21. The method of claim 18, wherein the time value is a first time value, and wherein the method further comprises:
receiving information identifying a second time value from the UE; and
determining the measurement information based at least in part on the first time value and the second time value.

22. The method of claim 18, wherein the service interruption measurement relates to at least one of:
a network-side service interruption associated with the handover, or
a UE-side service interruption associated with the handover.

23. The method of claim 18, wherein the service interruption measurement relates to a service interruption associated with a radio resource control reestablishment procedure, and wherein the time value identifies a time at which the UE declares radio link failure, or a time at which the first network node receives a radio resource control reestablishment complete message.

24. The method of claim 18, wherein the measurement configuration indicates that the measurement information is to be determined for a single handover.

25. A method of wireless communication performed by a network node, comprising:
- transmitting, to a user equipment (UE) and via a radio resource control reconfiguration message, a measurement configuration for a service interruption measurement regarding a handover of the UE from a source cell to a target cell;
- receiving or determining information identifying a first time value for the service interruption measurement;
- receiving information identifying a second time value for the service interruption measurement; and
- determining the service interruption measurement using the first time value and the second time value, wherein the service interruption measurement identifies a time length of a reduced capability of the UE in connection with the handover.

26. The method of claim 25, wherein the handover comprises a conditional handover, and wherein the second time value indicates a time at which the network node receives an indication that the UE has initiated the handover.

27. The method of claim 25, wherein the information identifying the first time value is received from a base station in a path switch request.

28. The method of claim 25, wherein the information identifying the second time value is received from a user plane function in a path switch acknowledgment message or a handover notification acknowledgment.

29. The method of claim 25, wherein the network node comprises at least one of:
- a base station,
- an access management function,
- a session management function, or
- a user plane function.

30. A user equipment (UE) for wireless communication, comprising:
- one or more memories; and
- one or more processors operatively coupled to the one or more memories, the one or more memories and the one or more processors configured to:
  - receive, via a radio resource control reconfiguration message, a measurement configuration for a service interruption measurement regarding a handover of the UE from a source cell to a target cell; and
  - transmit measurement information that identifies at least one of the service interruption measurement or a time value used to determine the service interruption measurement, wherein the service interruption measurement identifies a time length of a reduced capability of the UE in connection with the handover.

* * * * *